United States Patent [19]
Yamamoto

[11] Patent Number: 6,097,852
[45] Date of Patent: *Aug. 1, 2000

[54] IMAGE FORMING APPARATUS AND METHOD WITH MODES FOR COPYING AN ENTIRE EXTENT OF A DOCUMENT AND AN EXTENT EXCEPT FOR EDGE PORTIONS

[75] Inventor: Koji Yamamoto, Toyokawa, Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/819,847

[22] Filed: Mar. 17, 1997

[30] Foreign Application Priority Data

Mar. 19, 1996 [JP] Japan .................................. 8-063279
Dec. 26, 1996 [JP] Japan .................................. 8-347668

[51] Int. Cl.7 .............................. G06K 9/20; G06K 9/36
[52] U.S. Cl. ........................................ 382/282; 382/291
[58] Field of Search ................................ 358/449, 488, 358/451, 453, 452, 497, 538; 382/282, 283, 286, 291, 312, 317, 318, 319; 399/368, 369, 370, 371, 376

[56] References Cited

U.S. PATENT DOCUMENTS

| | | | |
|---|---|---|---|
| 4,449,152 | 5/1984 | Kurata | 358/451 |
| 4,541,713 | 9/1985 | Maekawa | 355/75 |
| 4,771,319 | 9/1988 | Hamakawa | 355/14 SH |
| 4,920,502 | 4/1990 | Yamada | 358/451 |
| 4,972,235 | 11/1990 | Iwamoto et al. | 355/311 |
| 5,040,079 | 8/1991 | Shimizu | 358/451 |
| 5,105,225 | 4/1992 | Honjo et al. | 355/50 |
| 5,198,853 | 3/1993 | Ichihara et al. | 358/449 |
| 5,325,213 | 6/1994 | Takahashi | 358/474 |
| 5,452,108 | 9/1995 | Muramatsu | 358/474 |

Primary Examiner—Amelia Au
Assistant Examiner—Timothy M. Johnson
Attorney, Agent, or Firm—Sidley & Austin

[57] ABSTRACT

A digital full-color copying machine (1) has a full-size mode for copying the entire extent of an original document (210) and a normal mode for copying the original document except for peripheral edge portions. When the normal mode is selected, the original document is conveyed to a position wherein a rear side edge of the original document contacts and is aligned by a fixed scale (205) provided at a side edge portion of an original document glass table (29) and a leading end edge of the original document contacts and is aligned by a movable scale (120) provided at a leading end portion of the original document glass table (29). When the full-size mode is selected, the original document is conveyed and positioned at a modified position with the rear side edge of the original document being aligned by the fixed scale (205) but with the leading end of the original document being spaced a specified distance from the movable scale (120). The reverse start position of the first slider (211) of the copying machine for the full-copy mode is spaced a specified distance from the reverse start position for the normal copy mode.

22 Claims, 17 Drawing Sheets

Fig.19(a)

(Inch-version)

| Original document | Paper sheet |
|---|---|
| Invoice | 8 X 10 |
| 8 X 10<br>G1  LTR | LTR |
| 8 1/4 X 11 3/4 | 8 2/3 X 13 |
| LTR<br>8 1/2 X 13<br>8 2/3 X 13 | 9 1/4 X 14 |
| 8 X 13<br>FLS | LGL |
| LGL<br>9 1/4 X 14 | 11 X 17 |
| 11 X 14<br>11 X 17 | 12 X 18 |

Fig.19(b)

(AB-version)

| Original document | Paper sheet |
|---|---|
| Postal card<br>A6 | B6 |
| B6 | A5 |
| A5 | B5 |
| B5 | A4 |
| A4 | B4 |
| B4 | A3 |
| A3 | 12 X 18 |

IMAGE FORMING APPARATUS AND METHOD WITH MODES FOR COPYING AN ENTIRE EXTENT OF A DOCUMENT AND AN EXTENT EXCEPT FOR EDGE PORTIONS

FIELD OF THE INVENTION

The present invention relates to an image forming apparatus, such as a copying machine for forming an image by reading an original image. In one aspect, the invention relates to an image forming apparatus having an original document positioning member provided adjacent to an end portion of an original document table on which an original document to be copied is placed.

BACKGROUND OF THE INVENTION

Conventionally, there has been provided an image forming apparatus, such as a digital copying machine, which reads an original document placed on an original document table or platen, formed of a transparent material such as glass, by exposing the document through the transparent original document table and scanning the exposed document with a scanning means, such as a scanner, so as to form an image.

In such an apparatus, an original document positioning member such as a scale is generally provided at an end portion of the original document table, where the document positioning member abuts against an end portion of an original document so as to position the original document in a specified placement position. This kind of original document positioning member includes a fixed type, which is provided in close contact with the end portion of the original document table, and a movable type, which can be located at a desired distance from the end portion of the original document table.

Among these, the movable type of original document positioning member is frequently adopted, particularly in an image forming apparatus which is provided with an automatic document feeder. The movable type of document positioning member is provided adjacent to the end portion of the original document table which is on the downstream side, in an original document feeding direction of the automatic document feeder, and operates to position the original document by abutting against the leading end of the original document by protruding a specified height above an upper surface of the original document table while the original document is being fed onto the original document table by the automatic document feeder and by retracting into a position lower than the upper surface of the original document table while the automatic document feeder discharges the original document from the original document table after scanning the original document, so as not to hinder the operation.

However, the apparatus provided with the movable type of original document positioning member has had problems as follows. In order to make the movable type of document positioning member movable between a first position in which the document positioning member protrudes above the upper surface of the original document table and a second position in which the document positioning member is lowered below the upper surface of the original document table, depending on the state of operation of the automatic document feeder, a specified gap must be provided between the document positioning member and the adjacent end portion of the original document table.

Therefore, when the original document is exposed and scanned by the scanning member, such as a scanner, in a state in which the original document has been placed so as to abut against the document positioning member, there is a possibility that the original document may be directly scanned by scanning light which has passed through the space between the document positioning member and the adjacent end of the original document table, and a possibility that the scanning light is interrupted by an extreme end portion of the original document table, possibly causing defective reading and loss of image.

However, these problems do not cause any particular disadvantage in most procedures for normal image formation wherein an image is to be formed on a paper sheet which is of the same size as the original document. This is because such procedure intentionally avoids the formation of any image of a specified extent of the peripheral edge portions of the original document, in order to prevent the possible occurrence of a jam at a fixing section, to reduce the smear of the apparatus body by the toner, and for other reasons.

However, as original documents having an image on the full extent of the document (e.g., photographs) have become more common in accordance with the recent popularization of full-color copying machines, there is a growing demand for forming an image of the entire extent of the original document. In such a case, the defective reading and the loss of image at the end portion of the original document, due to the movable type of document positioning member as described above, become serious problems.

SUMMARY OF THE INVENTION

The present invention has been developed to provide a solution to the aforementioned problems, and an object of the invention is to provide an image forming apparatus which is capable of forming an copy image with regard to the entire extent of an original document while causing neither defective reading nor loss of image at the end portion of the original document even when the movable type of document positioning member is employed.

The present invention provides an image forming apparatus for forming an image by reading an original image, wherein the apparatus comprises: an original document table on which an original document to be read can be placed; a scanner for exposing and scanning the original document placed on the original document table; a reader for reading the original image based on the scanning of the original document by the scanner; a mode setter for selectively setting a first mode, in which a specified extent of the peripheral edge portions of the original document is not subjected to image formation, or a second mode, in which the entire extent of the original document is subjected to image formation; and a controller for setting the extent of scanning, by the scanner with respect to the original document table, at a first position for said first mode and at a second position for said second mode, said second position being different from said first position.

In a presently preferred embodiment of the invention, an original document positioning member is provided adjacent to an end portion of the original document table and is movable between an operating position, in which the document positioning member abuts against the original document by protruding a specified height above an upper surface portion of the original document table, and a retracting position, in which the document positioning member is lowered below the upper surface portion of the original document table. In this embodiment, the original document can be aligned in the first position by the leading edge of the original document abutting the movable positioning member, while the original document is placed in the second position such that the leading edge of the original document is spaced apart from the movable positioning member by a specified distance.

With these arrangements of the image forming apparatus of the present invention, the extent of exposing and scanning the original document by the scanner in the second mode is set at a limit, which is located apart from the corresponding limit of the original document in the first mode by the specified distance, for subjecting the entire extent of the original document to image formation. Therefore, by placing the original document in the second position corresponding to the modified extent of scanning, e.g., in the position located apart from the document positioning member by a specified distance, the entire extent of the original document can be read so as to be subjected to image formation while causing neither the aforementioned defective reading nor loss of image at the end portion of the original document.

When the image forming apparatus is provided with an automatic document feeder (ADF), it is preferable to place the original document in a position where the original document is abutted against the document positioning member when the aforementioned first mode is set, and to place the original document in a position where the original document is located apart from the document positioning member by a specified distance when the second mode is set. That is, a positioning accuracy is improved by abutting the original document against the document positioning member in the first mode in which the specified extent of the peripheral edge portions of the original document is not subjected to image formation, and by placing the original document in a position in which the original document is located apart from the document positioning member by a specified distance in correspondence with the extent of scanning by the scanner in the second mode in which the entire extent of the original document is subjected to image formation.

When an operator manually sets an original document on the original document table, it is preferable to designate the placement position of the original document by a designator when the second mode is set. As the designator described above, for example, a liquid crystal display panel provided at an operation panel of the image forming apparatus can be utilized. By designating the proper placement position of the original document by such a designator when the second mode is set, the possible erroneous operation of improperly setting the original document by abutting it against the document positioning member despite the fact that the second mode is set can be prevented.

When the scanner of the image forming apparatus of the present invention scans the original document in forward and reverse directions and reads the image based on the scanning in the reverse direction, the extent of scanning in the second mode can be set by controlling a scanning start position in the reverse direction.

It is preferable to execute control in the second mode such that a paper sheet of a size larger than the original document size is fed as a recording paper sheet. With this arrangement, the possible occurrence of a jam at the fixing section is prevented, and the smear of the apparatus body by the toner is reduced, even when the entire extent of the original document is subjected to image formation.

BRIEF DESCRIPTION OF THE DRAWINGS

FIGS. 19 (a) and 19 (b) are tables showing an example of automatic paper sheet selection executed in a full-size mode.

DETAILED DESCRIPTION OF THE INVENTION

A preferred embodiment of the present invention will be described below with reference to the accompanying drawings.

Figure 1:
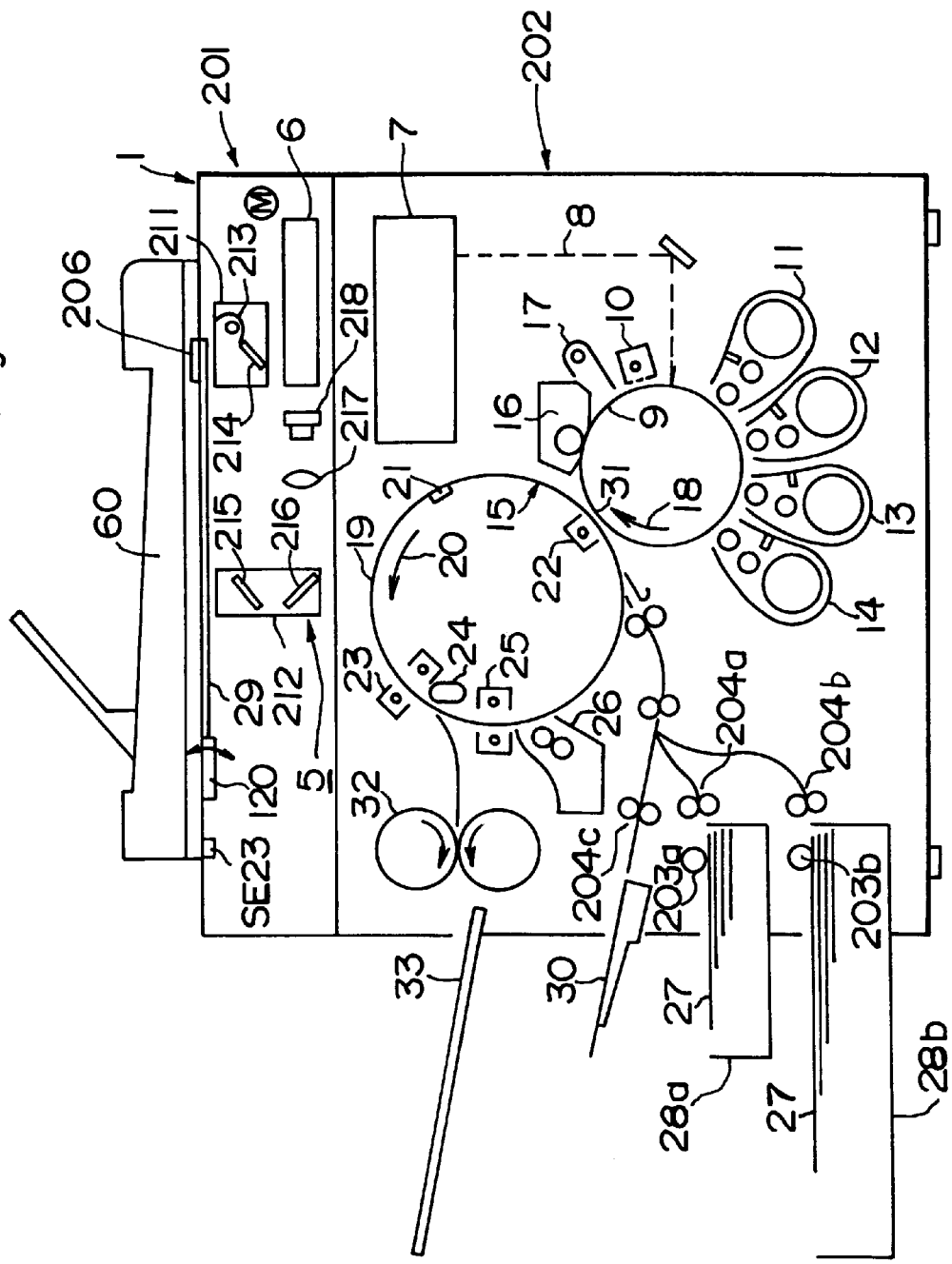
FIG. 1 is a diagrammatic view showing the construction of a digital full-color electrophotographic copying machine according to an embodiment of the present embodiment.

FIG. 1 is a diagrammatic view showing the construction of a digital full-color electrophotographic copying machine 1 incorporating the present invention. The full-color copying machine 1 includes an image reader section 201 and a printer section 202.

The image reader section 201 includes: a scanning optical section 5, which exposes and scans the image of an original document 210 positioned on an original document glass table 29 at an upper surface portion of the body of the copying machine 1 so as to read the image; and an image storing section 6, which transfers printing data to a printer section 202 based on image data read by the scanning optical section 5.

The scanning optical section 5 is provided with a first slider 211, a second slider 212, an image forming lens 217, and a CCD image sensor (hereinafter referred to as a CCD)

218. The first slider 211 has a lamp 213, which illuminates the original document 210 through the transparent original document glass table 29, and a mirror 214, which directs light reflected by the original document 210 to the second slider 212. The second slider 212 has two mirrors 215 and 216, which further direct the light, reflected by the original document 210, from the mirror 214 through the image forming lens 217 to the CCD 218.

The first slider 211 is driven by a slider motor M so that the first slider 211 moves along the original document glass table 29 from the right-hand side to the left-hand side or from the left-hand side to the right-hand side, with regard to the illustration in FIG. 1, while the second slider 212 moves at a half speed in the same direction as that of the first slider 211. This direction of movement is referred to as a sub-scanning direction. Movement control of the first slider 211 will be described in detail later.

In the scanning optical section 5 constructed as above, when the original document 210 positioned on the original document glass table 29 is illuminated by the lamp 213 while the first slider 211 is moving in a specified direction, the light, reflected from the original document 210, is directed by the mirrors 214–216 of the first and second sliders 211 and 212 through the image forming lens 217 to form an image on the CCD 218.

In the CCD 218, the reflected light from the original document 210 is photoelectrically converted into multi-value signals for the three colors R, G and B. These three-color multi-value signals are further converted in an image processing section (not shown) into digital image data corresponding to four colors of cyan, magenta, yellow, and black, which are thereafter transferred to the image storing section 6. The image storing section 6 generates printing data (laser drive signal) based on these digital image data and transfers the data to a laser exposure unit 7.

The printer section 202 includes the laser exposure unit 7 and a photoreceptor drum 9. The laser exposure unit 7 makes a laser diode (not shown) emit light, modulatedly based on the printing data transferred from the aforementioned image storing section 6, and exposes a peripheral surface of the photoreceptor drum 9, which rotates in a direction indicated by an arrow 18 in FIG. 1, to laser light in an optical path indicated by the dashed line 8 in FIG. 1. Around the photoreceptor drum 9 are arranged an electric charger 10, developing units 11 through 14, a transfer unit 15, a remaining toner cleaning unit 16, and a remaining electric charge removing unit 17.

The developing units 11, 12, 13, and 14 store developers therein, including toners of yellow, magenta, cyan and black, respectively, and each time an electrostatic latent image of a respective color is formed on the photoreceptor drum 9, the corresponding developing unit is driven to effect the visualization of the latent image.

The transfer unit 15 is provided with a transfer drum 19. The transfer drum 19 is rotatably mounted for rotation, in a direction indicated by the arrow 20 in FIG. 1, at the same peripheral speed as that of the photoreceptor drum 9 so that the transfer drum 19 winds a transfer material (paper sheet) 27 around its peripheral surface to subject the paper sheet 27 to transfer. Around the transfer drum 19 are provided a chucking claw 21 for retaining the transfer material, a transfer charger 22, a first discharger 23, a separator 24, a second discharger 25 for removing the remaining electric charges, and a residue cleaner 26. On the left-hand side of the transfer unit 15 in FIG. 1 is arranged a heated rollers fixing unit 32 for fixing a toner image transferred onto the transfer material (paper sheet) 27.

The printer section 202 is further provided with paper sheet feed trays 28a and 28b and a manual feed tray 30. In the paper sheet feed trays 28a and 28b are stored paper sheets 27, which are transfer material in a stacked state, and an uppermost sheet in the selected tray is picked up by pickup roller 203a or 203b and conveyed toward a transfer position 31 (the position where the photoreceptor drum 9 and the transfer drum 19 face each other) by a pair of paper sheet feed rollers 204a or 204b. In the manual feed tray 30, a paper sheet 27, fed manually by the operator, is sent to the transfer position 31 by a pair of paper sheet feed rollers 204c.

When a full-color image is formed in the printer section 202 having the above construction, a portion of the peripheral surface of the photoreceptor drum 9, electrically charged uniformly by the electric charger 10, is exposed to laser light by the laser exposure unit 7, so that electrostatic latent images, corresponding to the image data of the colors of yellow, magenta, cyan and black, are successively formed and successively developed by the corresponding developing units 11–14 in order to form toner images.

The paper sheet 27, fed from one of the paper sheet feed trays 28a and 28b or the manual feed tray 30, is sent to the transfer position 31 in synchronization with the leading end of the toner image of the first color (yellow toner image) on the photoreceptor drum 9 is wound around the transfer drum 19.

The toner images of the respective colors formed on the photoreceptor drum 9 are successively transferred and overlapped with one another onto the paper sheet 27 that is wound around the transfer drum by the electric discharge from the transfer charger 22 in the transfer position 31. When the transfer of the toner images of the four colors is completed, the paper sheet 27 is electrically discharged by the first discharger 23 and then separated from the transfer drum 19 by the separator 24. The paper sheet 27 onto which the toner images have been transferred is sent to the fixing unit 32 by a conveyor (not shown). After undergoing the fixing of toner, the paper sheet 27, having a fixed composite image thereon, is discharged onto a discharge tray 33.

Figure 2:
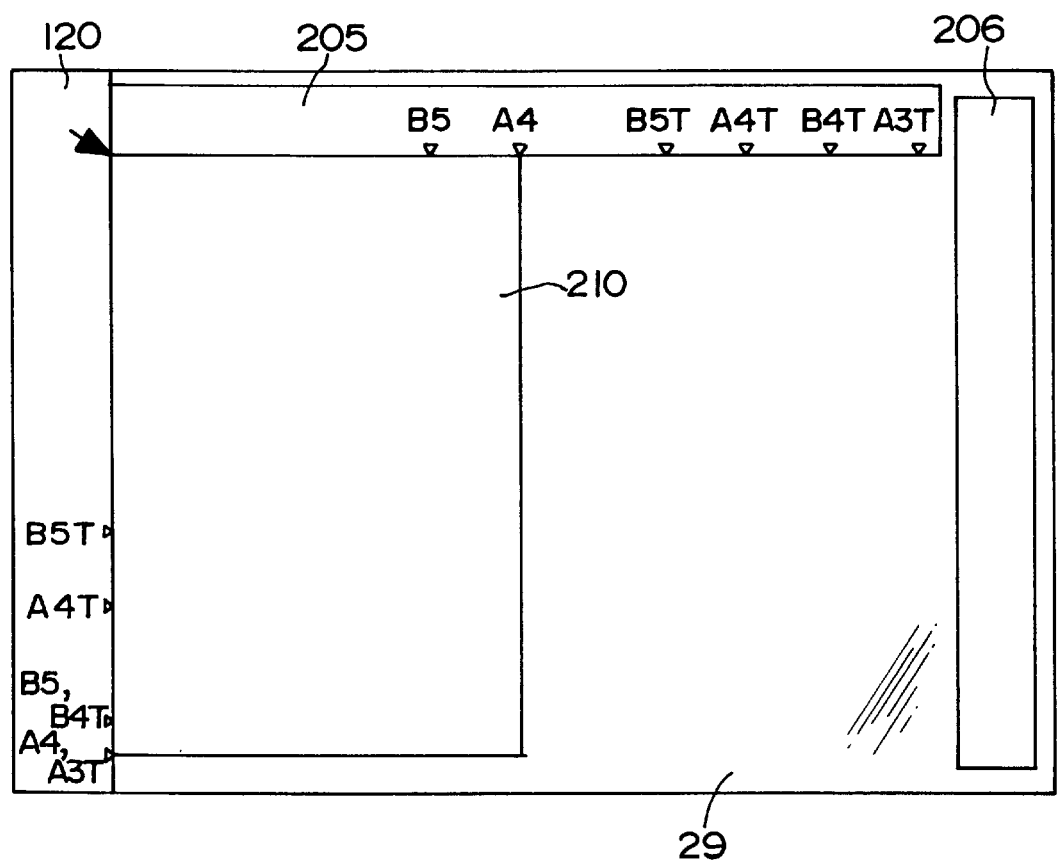
FIG. 2 is a top view of an original document glass table of the copying machine of FIG. 1.

FIG. 2 is a top view of the original document glass table 29. As shown in FIG. 2, a movable scale 120 is provided at a left-hand end portion of the original document glass table 29. The movable scale 120 abuts against an original document 210 which has been conveyed from the right-hand side to the left-hand side in FIG. 2 during the stage of automatic document feeding by an ADF 60 (shown in FIG. 3 and described later), so as to position the original document 210 for reproduction thereof. The construction and operation of the movable scale 120 will be described in detail later.

A fixed scale 205 is provided at an upper end portion of the original document glass table 29, as shown in FIG. 2, and an upper left-hand corner portion (indicated by the arrowhead in FIG. 2), formed by the intersection of the movable scale 120 and the fixed scale 205, serves as a reference for an original document placement position.

A shading correction plate 206, which is a reference white plate to be read during the stage of shading correction, is provided at a right-hand end portion of the original document glass table 29, as shown in FIG. 2. Since the contents and procedure of the shading correction are known techniques, no description is provided therefor.

A sensor (not shown), with a known structure for detecting the size and orientation of the original document 210, is provided below the original document glass table 29. The sensor can be constructed by arranging, for example, a plurality of reflection type photointerrupters in various positions corresponding to different original document sizes.

Figure 3:
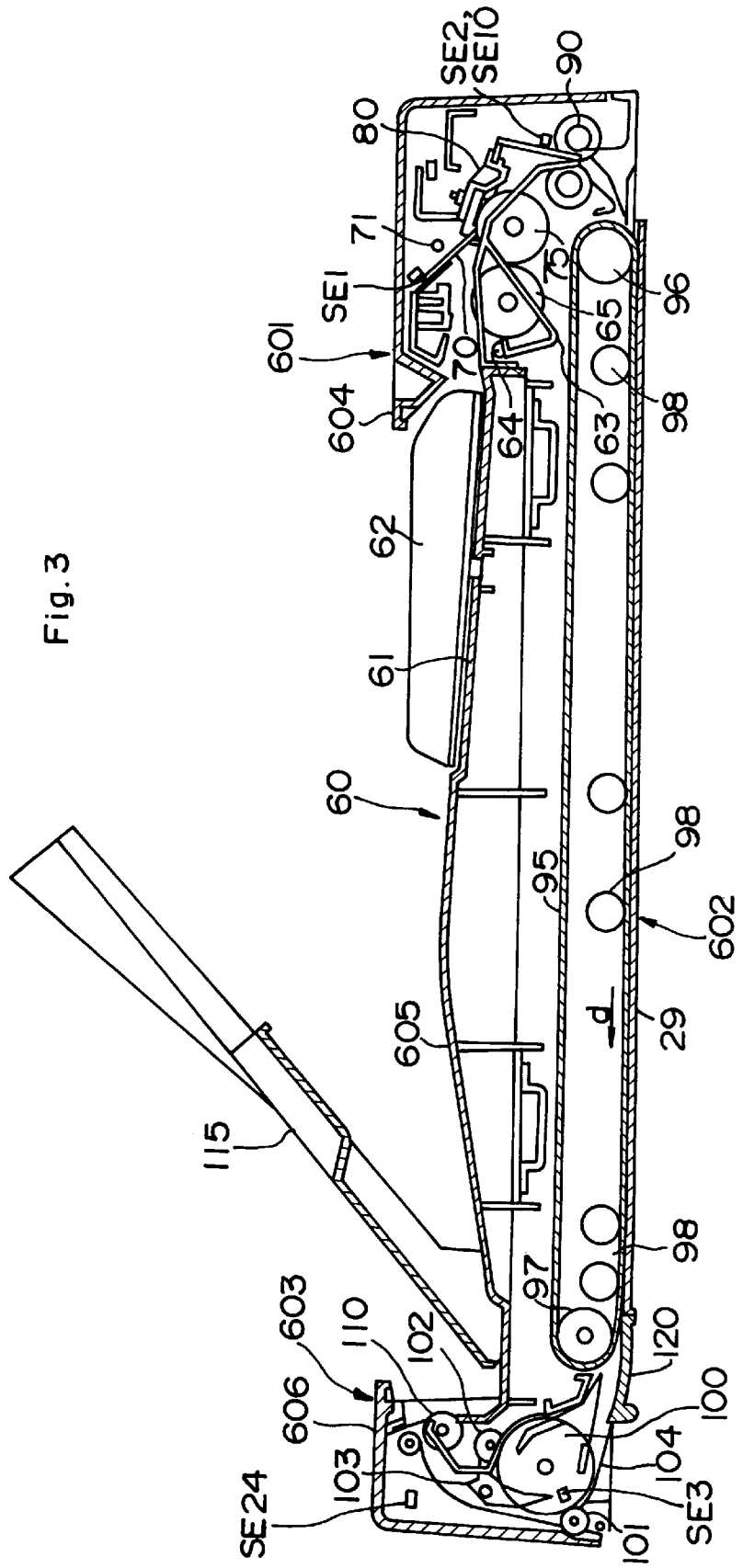
FIG. 3 is an elevational view, partly in cross section, showing a construction of the automatic document feeder (ADF) of the copying machine of FIG. 1.

FIG. 3 is an explanatory view of details of the ADF 60. The ADF 60 includes an original document feeding section 601, an original document conveying section 602, and an original document discharging section 603.

The original document feeding section 601 is provided with an original document tray 61, a side portion regulating plate 62, a leading end regulating plate 63, a pickup roller 65, an original document pressing plate 70, a handling roller 75, a handling pad 80, and a resist roller 90; and these components, except the original document tray 61, are covered by a cover 604 which can be opened and closed.

The original document conveying section 602 is provided with: a driving roller 96, which is arranged in the vicinity of the original document feeding section 601; a driven roller 97, which is arranged in the vicinity of the original document discharging section 603; and a conveyor belt 95; and these components are covered by a cover 605, a part of which also constitutes the original document tray 61.

The original document discharging section 603 is provided with a reversing roller 100, a discharge roller 110, and a discharge tray 115; and these components, except the discharge tray 115, are covered by a cover 606 which can be opened and closed.

This ADF 60 is placed on the upper surface of the body of the copying machine 1 so that the conveyor belt 95 is positioned on the original document glass table 29 and is made openable with respect to the upper surface of the original document glass table 29 by a hinged metal fitting (not shown) which is provided on the rear side, i.e., the side opposite to the operating side.

When the operator manually positions an original document 210 on the original document glass table 29, the operator lifts up the ADF 60 so as to expose the upper surface of the original document glass table 29. The opening and closing of the ADF 60 is detected by a magnetic sensor SE23, shown in FIG. 1, and the ADF 60 is made operable upon detection by the magnetic sensor SE23 of the event that the ADF 60 is correctly closed.

The original documents 210 to be fed are placed on the original document tray 61 with the first page face up. In this stage, the original documents 210 are regulated in position in the widthwise direction by the side portion regulating plate 62, and their leading ends are regulated in position by the leading end regulating plate 63.

The leading end regulating plate 63 and the pressing plate 70 can be pivoted around support pins 64 and 71, respectively. During the stage of paper sheet feeding, the leading end regulating plate 63 is retracted to a lower position from the time when the first original document 210 is fed to the time when the feeding of the last original document 210 is completed. The pressing plate 70 moves downwardly from its retracted position, shown in FIG. 3, when the first original document 210 is fed, to press the leading end portion of the original document 210 against the pickup roller 65, thereby giving a paper feeding pressure to the original document 210.

Each of the pickup roller 65 and the handling roller 75 is rotatively driven in the clockwise direction during the stage of paper feeding. The original documents 210 are made to pass one by one, beginning with the original document located in the lowermost position, through a space between the handling roller 75 and the handling pad 80, and are sent to the resist roller 90. The resist roller 90 makes each original document 210 pause, at its nip portion, and then conveys the original document 210 to the entrance of the original document glass table 29 by being rotatively driven after a lapse of a specified time.

The conveyor belt 95 is extended in an endless form between the driving roller 96 and the driven roller 97 so that the conveyor belt 95 covers the entire upper surface of the original document glass table 29. Several backup rollers 98 are rotatably provided inside the conveyor belt 95 for pressing the conveyor belt 95 against the upper surface of the original document glass table 29. The conveyor belt 95 is rotatively driven in a direction indicated by the arrow d, so as to position the original document 210 at a specified placement position on the original document glass table 29.

In the vicinity of the reversing roller 100 are provided pinch rollers 101 and 102 and a diverter pawl 103 for the purpose of changing the sheet path in order to reverse the original document 210 during a stage of a dual-surface original document mode. The diverter pawl 103 is normally set in a position indicated by the solid lines. After completing exposure, the original document 210 is discharged from the original document glass table 29, based on the rotation of the conveyor belt 95 in the direction of the arrow d and the rotation of the reversing roller 100 in a clockwise direction, and is guided upwardly by a guide plate 104 and the diverter pawl 103 to be discharged onto the discharge tray 115 by the discharge roller 110.

In the case of a dual-surface original document 210, in order to first subject the second surface (back surface) to a copying process, the diverter pawl 103 is turned a specified angle in the clockwise direction from the illustrated state when feeding the dual-surface original document 210 onto the original document glass table 29. First, the dual-surface original document 210 is reversely conveyed around the reversing roller 100, and the original document 210 is fed back onto the upper surface of the original document glass table 29 with the second surface of the dual-surface original document 210 being face down. In this stage, the conveyor belt 95 is rotatively driven in the direction opposite to the direction of the arrow d. Further, after completing the exposure of the second surface of the dual-surface original document 210, the dual-surface original document 210 is reversely conveyed around the reversing roller 100 in order to start the copying process of the first surface (front surface) of the dual-surface original document 210. The reversing roller 100 and the discharge roller 110 are rotatively driven by a discharge motor.

The ADF 60 is provided with a variety of sensors SE1, SE2, SE3, SE10 and SE24 for detecting the original document 210. The sensor SE1 detects the presence or absence of an original document 210 on the original document tray 61. The sensor SE2 is placed just before the resist roller 90 so as to detect the reach and passage of an original document 210 and, in cooperation with a timer, the length of the original document 210 when the original document 210 is sent out from the resist roller 90. The sensor SE10 is arranged parallel to the sensor SE2 so as to detect the width of the original document 210.

Based on document detection signals from the sensors SE2 and SE10, the size of the original document 210 is determined, including the determination of whether the original document 210 is to be fed lengthwise (when the longer side of the original document 210 is parallel to the feeding direction) or to be fed sideways (when the shorter side is parallel to the feeding direction). Therefore, the sensors SE2 and SE10 function as an original document size detecting means.

Further, the sensor SE3 is placed at the entrance of the reversing roller 100 so as to detect an original document 210 that passes thereby. The sensor SE24 is placed at the entrance of the discharge roller 110 so as to detect the trailing end of an original document 210 that passes thereby, thus detecting the event of the discharging of the original document 210 being completed.

FIGS. 4 through 7 are explanatory views of details of the construction and operation of the movable scale 120.

As shown in FIGS. 4–7, the movable scale 120 is pivotally mounted on a pivot pin 122, which is supported by a holder 121, provided on the rear side and on the front side of the upper surface frame 2 of the body of the copying machine 1, with the leading end (the end closest to the original document glass table 29) of the movable scale 120 being urged upwardly by a spring 123.

A protrusion 120a, which faces the upper surface frame 2, and a protrusion 120b, which protrudes into a space below a lower portion of the original document glass table 29, are provided at the bottom of the movable scale 120. A roll-in preventing portion 120f, which protrudes toward the adjacent end surface of the original document glass table 29, is provided at the bottom of a leading end surface 120c of the movable scale 120. Further, a lever abutment portion 120d is provided at a rearward upper portion of the movable scale 120, while a plurality of cutaway portions 120e, each having a specified length, are provided at an upper corner portion of a leading end side of the movable scale 120.

Figure 4:
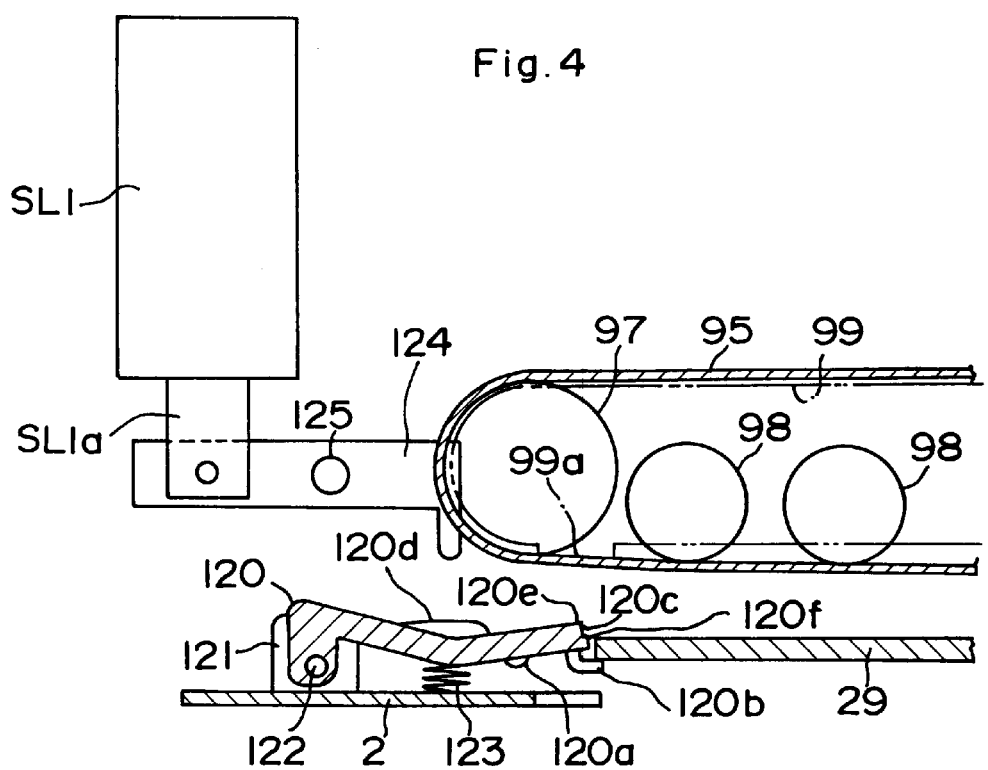
FIG. 4 is an elevational view, partly in cross section, showing the movable scale with the ADF opened.

With the above arrangement, in a state in which the ADF 60 is opened with respect to the body of the copying machine 1 as shown in FIG. 4, the movable scale 120 is positioned so that an upper surface portion of the protrusion 120b abuts against the lower surface of the original document glass table 29 and the leading end 120c of the movable scale 120 protrudes a specified height above the upper surface of the original document glass table 29 as a result of the urging force of the spring 123. In this state, the roll-in preventing portion 120f at the leading end 120c of the movable scale 120 is retained below the upper surface of the original document glass table 29. Therefore, the original document 210, which is placed on the original document glass table 29, can be correctly positioned in a specified position with its one end portion abutted against the leading end surface 120c of the movable scale 120.

Figure 5:
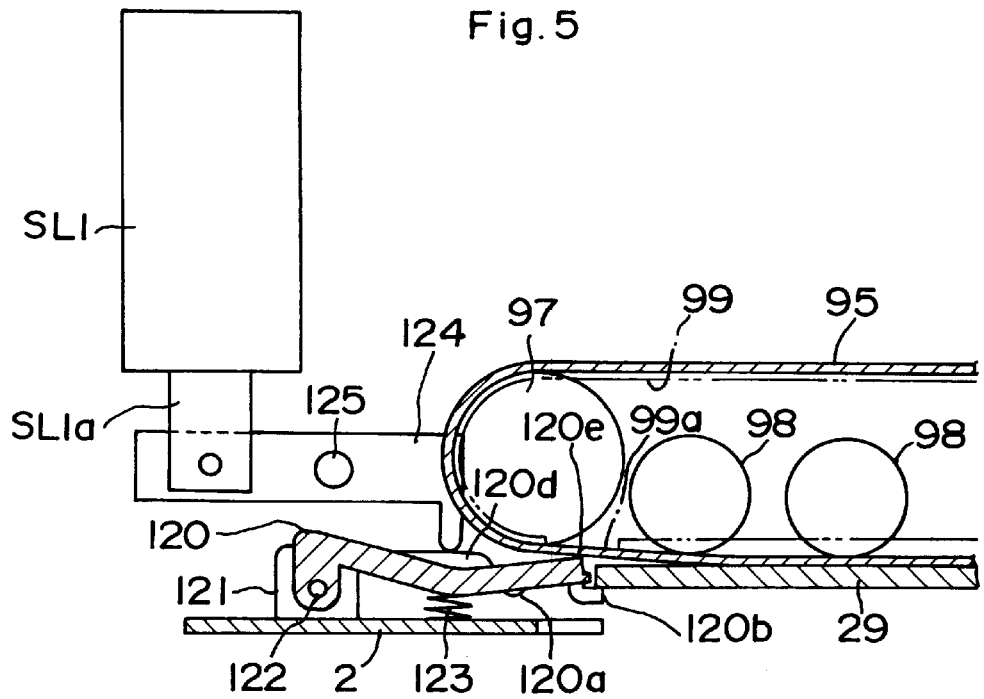
FIG. 5 is an elevational view, partly in cross section, showing the movable scale with the ADF closed.

In a state in which the ADF 60 is closed with respect to the body of the copying machine 1 as shown in FIG. 5, a protruding portion 99a of a frame 99, for supporting the roller 97 and the conveyor belt 95, abuts against the movable scale 120, while the movable scale 120 is maintained in a state in which its leading end portion is positioned in contact with the conveyor belt 95 and protrudes above the upper surface of the original document glass table 29 by a specified height.

In this stage, the movable scale 120 is positioned so that it is slightly lower than its state shown in FIG. 4. The frame 99 is retained in parallel with the original document glass table 29 by a positioning member (not shown). Therefore, when the ADF 60 is mounted on the body of the copying machine 1, a positional relationship between the conveyor belt 95 and the leading end of the movable scale 120 and their state of contact can be easily and reliably maintained.

As a result, the above arrangement obviates the need for pivotal adjustment of the movable scale 120 and prevents the original document 210 from passing without regulation by the movable scale 120, based on the shortage of a pressure force and the amount of pressure, thereby allowing the original document 210 to be reliably regulated by the movable scale 120. Furthermore, the above arrangement assures an improved original document stop accuracy when the leading end of the original document 210 is abutted against the movable scale 120, so that skew (feeding aslant) can be reliably corrected.

Figure 6:
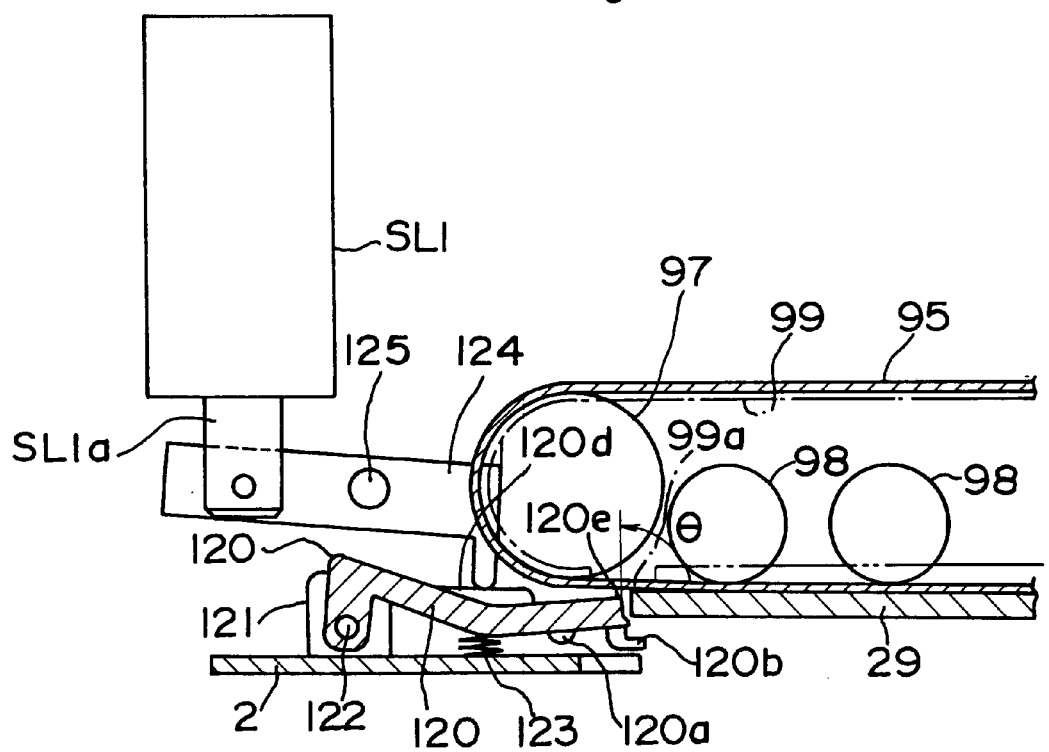
FIG. 6 is an elevational view, partly in cross section, showing the movable scale in a partially depressed condition.
Figure 7:
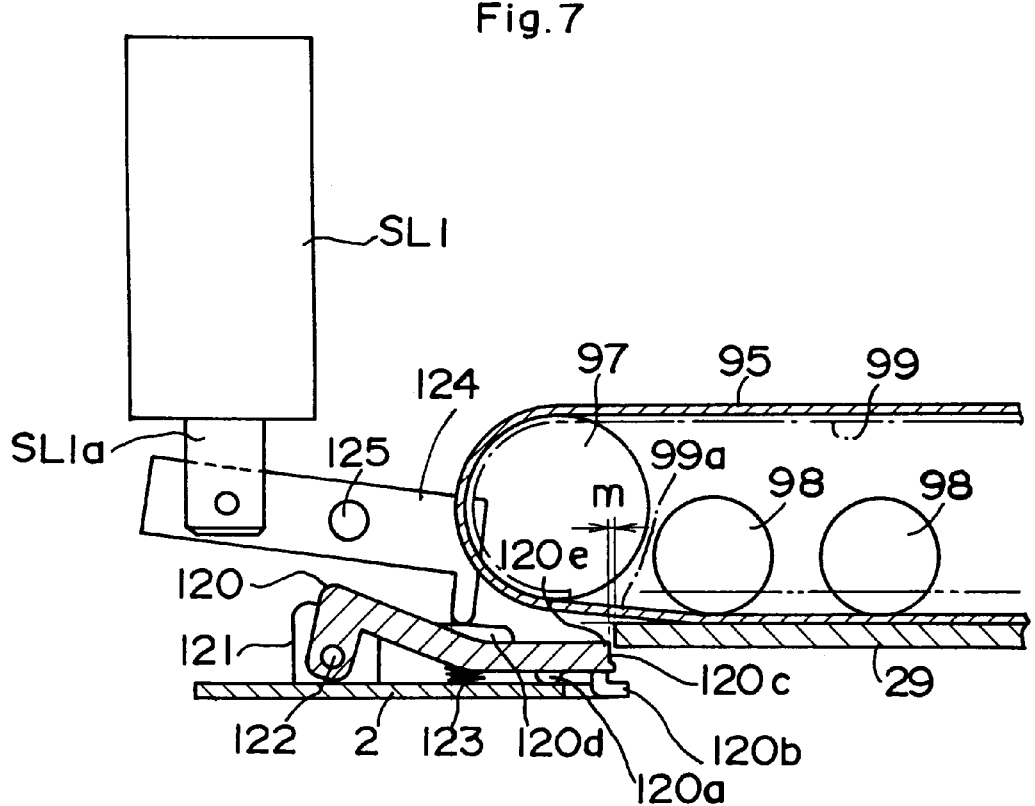
FIG. 7 is an elevational view, partly in cross section, showing the movable scale in a fully depressed condition.

A lever 124, for pivoting the movable scale 120, is pivotally mounted on a support pin 125, which is supported by an internal frame (not shown) of the ADF 60. A first end of lever 124 is pivotally connected to a plunger SL1a of a solenoid SL1. When the ADF 60 is closed, the second end of the lever 124 abuts against the lever abutment portion 120d of the movable scale 120, as shown in FIG. 6. Then, when the solenoid SL1 is switched from an OFF-state to an ON-state, the lever 124 pivots clockwise so that the second end of the lever 124 presses the lever abutment portion 120d of the movable scale 120 downwardly, as shown in FIG. 7, and the movable scale 120 turns in the clockwise direction, consequently lowering its leading end 120c below the original document glass table 29.

By adopting the above construction, the original document 210, which has been conveyed on the original document glass table 29 from the right-hand side thereof to the left-hand side thereof, as illustrated in FIGS. 1–7, based on the movement in the direction of the arrow d (see FIG. 3) by the conveyor belt 95, stops with its leading end portion, on the downstream side in the direction of movement, abutted against the leading end surface 120c of the movable scale 120.

Subsequently, the copying machine 1 starts an exposing operation. When the exposing operation is completed, the solenoid SL1 is switched from the OFF-state to the ON-state, and the lever 124 pivots around the support pin 125 in the clockwise direction in FIGS. 4–7, thereby pressing the lever abutment portion 120d downwardly. By this operation, the movable scale 120 pivots around the support pin 122 in the clockwise direction in FIG. 6, so that the leading end portion 120c of the movable scale 120 is lowered below the upper surface of the original document glass table 29 and the original document 210 can be conveyed to the paper sheet discharge side (left-hand side) in accordance with the movement of the conveyor belt 95.

When the pivotal support pin 122 of the movable scale 120 is placed lower than the upper surface of the original document glass table 29, a gap m (see FIG. 7) between the leading end surface 120c of the movable scale 120 and the original document glass table 29 is reduced accordingly as the movable scale 120 is lowered. An angle $\theta$ (see FIG. 6) between the leading end surface 120c of the movable scale 120 and the upper surface of the original document glass table 29 is set so as to be equal to or greater than a right angle with regard to the paper sheet feeding direction of the original document 210 even when the movable scale 120 is protruded above or lowered below the upper surface of the original document glass table 29.

As a result, if by any chance the leading end of the original document 210 is caught by the leading end surface 120c of the movable scale 120 when the movable scale 120 is positioned below the original document glass table 29, the original document 210 raises its leading end, by virtue of its own stiffness and a guiding function of the angle $\theta$, to easily pass over the leading end portion 120c of the movable scale 120. Therefore, the original document 210 is not rolled into the gap between the movable scale 120 and the adjacent end of the original document glass table 29, causing either a paper jam or damage to the leading end of the original document 210.

Figure 8:
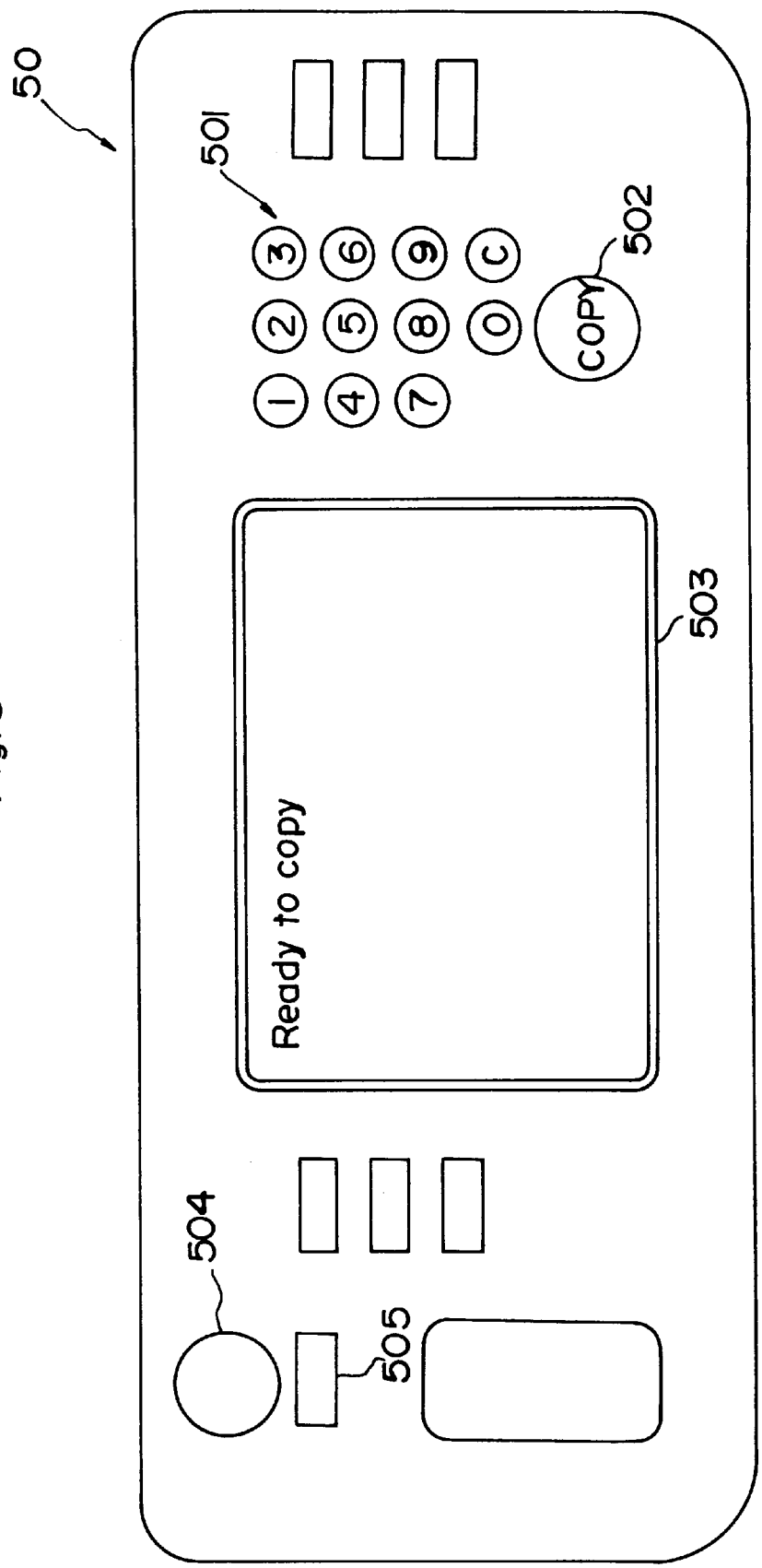
FIG. 8 is a view showing the configuration of an operation panel of the copying machine of FIG. 1, with a first display message.
Figure 9:
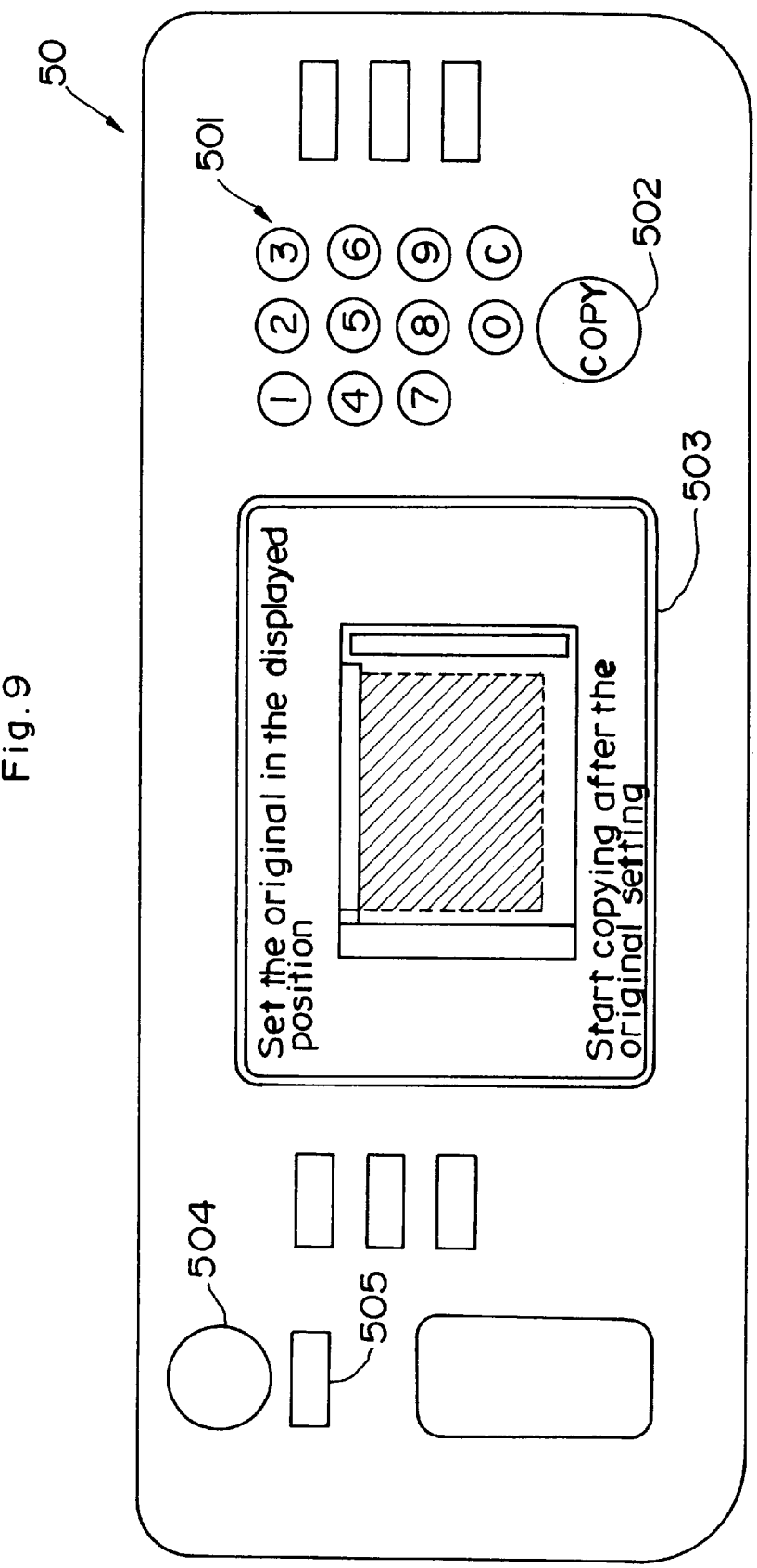
FIG. 9 is a view showing the operation panel of FIG. 8, with a second display message.

FIGS. 8 and 9 are views showing the construction of the operation panel 50 provided on the upper surface of the copying machine 1. The operation panel 50 is provided with ten-digit keys 501 for inputting the number of copies, a start key 502 for designating the start of copying, an LCD panel 503 for displaying various copying conditions, a full-size mode selection key 504 for selecting copying in a full-size mode described later, and an LED 505 for displaying the state of selection of the full-size mode.

Figure 10:
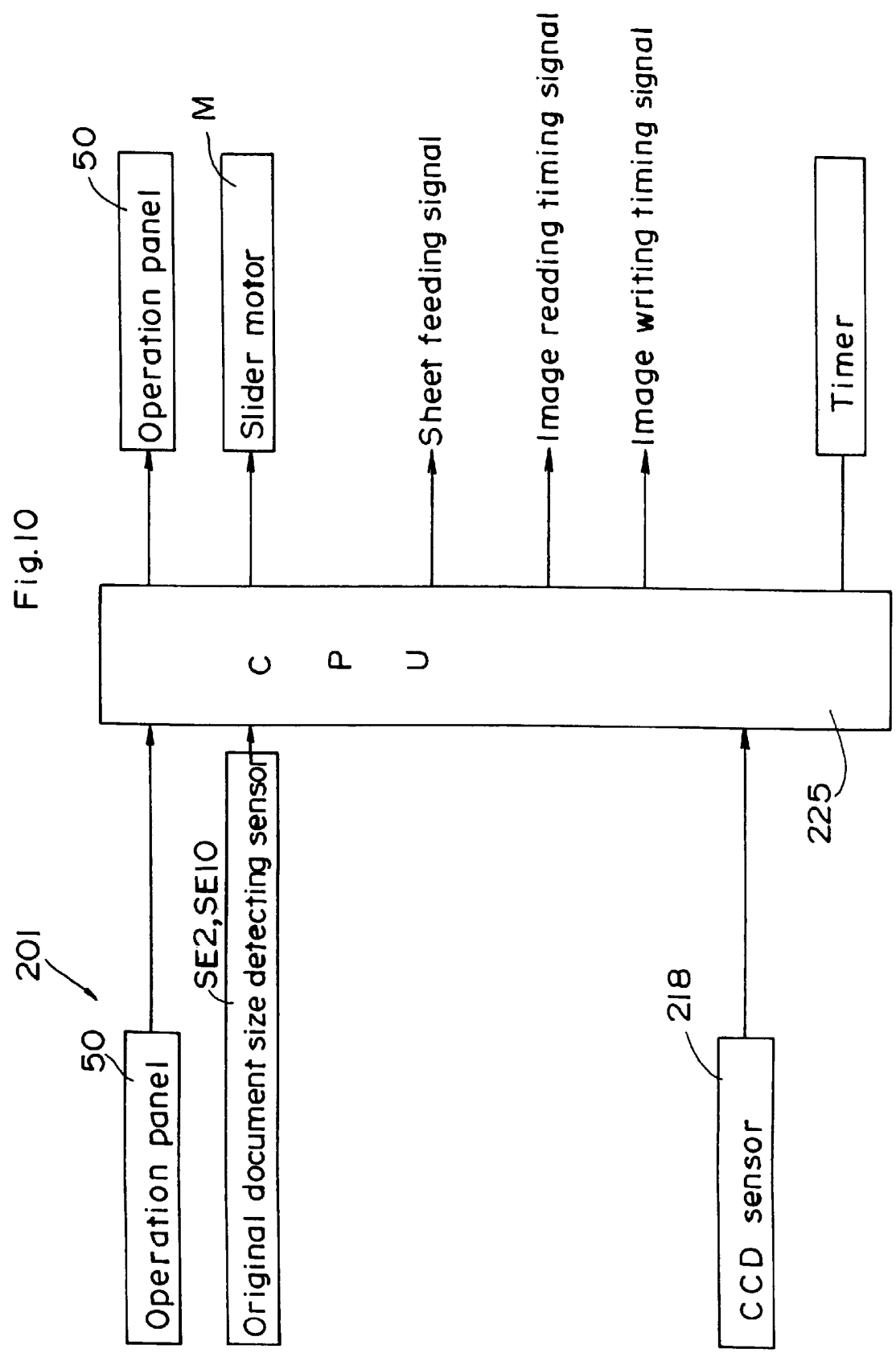
FIG. 10 is a block diagram showing a control system for an image reader section of the copying machine of FIG. 1.

FIG. 10 is a block diagram of a control system of the image reader section 201 of the copying machine 1. This control system includes a CPU 225. The CPU 225 is connected to the operation panel 50, to the sensors SE2 and SE10 in the ADF 60 for detecting the original document size, to the CCD sensor 218, to a slider motor M, etc.

A signal corresponding to an operation by the operator at the operation panel, a signal from the ADF 60 obtained by detecting the original document size, etc., are inputted to the CPU 225. The CPU 225 outputs a signal for making the display panel 503 of the operation panel 50 display a specified indication, a signal for controlling the driving of the slider motor M, a paper sheet feeding signal, an image reading timing signal, an image writing timing signal, etc. Furthermore, the CPU 225 is connected to a timer for providing timing for image reading and image writing.

The copying machine 1 of the present embodiment having the above construction can operate in either of two copying modes: a normal mode, in which a specified extent of the peripheral edge portions of the original document 210 is not subjected to a copying process; and a full-size mode, in which the entire extent of the original document 210 is subjected to a copying process.

In the copying machine 1, the normal mode can be set as a preference, or default, mode. In an initial state at the time of turning ON the power to the copying machine 1, the normal mode is selected. Upon the pressing of the full-size mode selection key 504 of the operation panel 50 in this default state, the LED 505 is activated to ON and the full-size mode becomes the selected mode. Upon the pressing of the full-size mode selection key 504 in the state in which the full-size mode has been selected, the mode is restored to the normal mode and the LED 505 is turned OFF.

Outlines of image reading and image writing timings in the normal mode and the full-size mode and movement control of the first slider 211 will be described below with reference to FIGS. 11 and 12.

Figure 11:
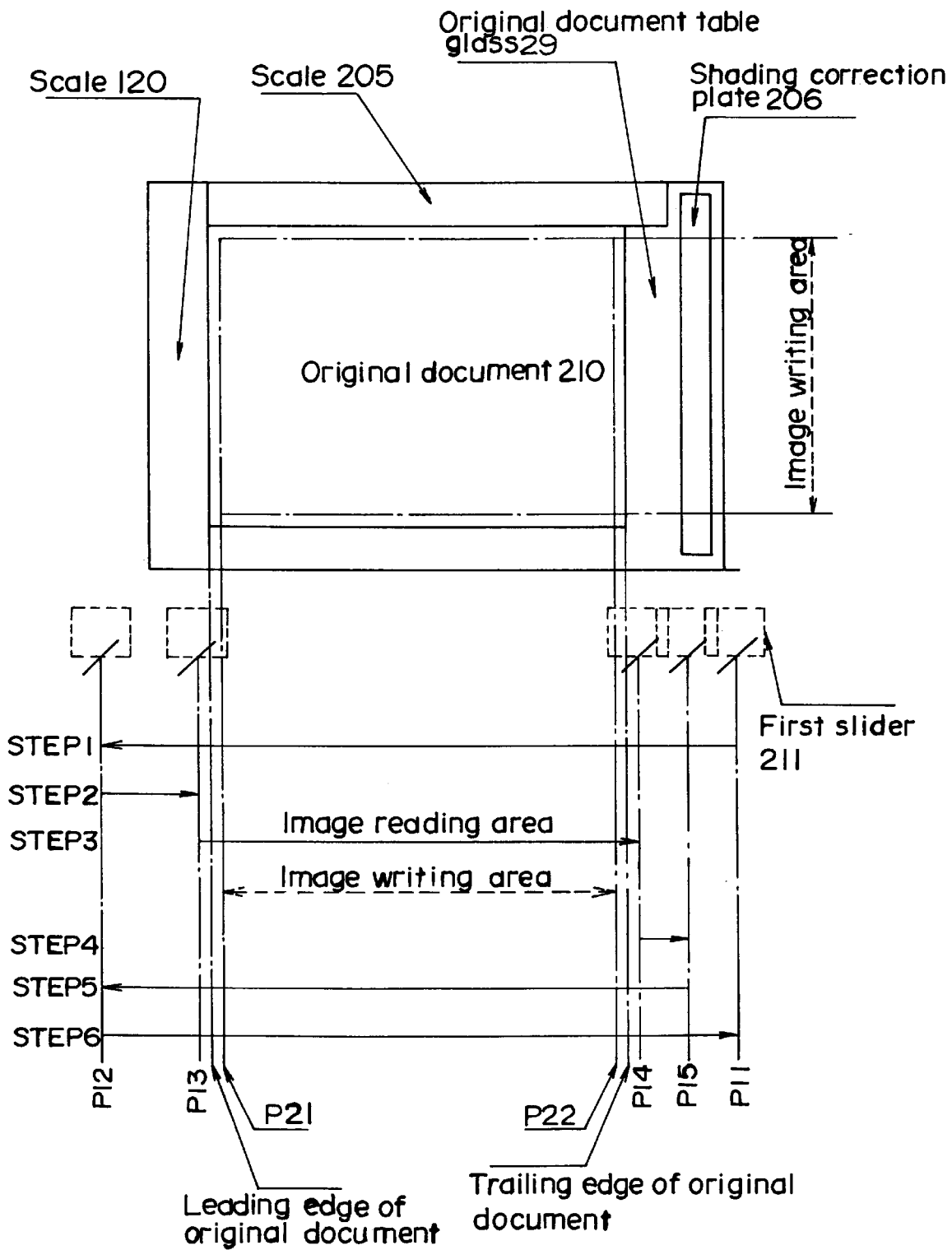
FIG. 11 is a diagrammatic view showing the operation of the first slider of the copying machine of FIG. 1 in the normal mode.

FIG. 11 shows the case of the normal mode, in which a positional relationship between the original document 210, positioned on the upper surface of the original document glass table 29, and the first slider 211, that moves below the original document glass table 29, is schematically shown.

When the start key 502 of the operation panel 50 is turned ON during the state in which the normal mode is the selected mode, the original document 210 is conveyed and positioned by the ADF 60 in the illustrated normal placement position, i.e., a position in which the leading end of the original document 210 abuts against the movable scale 120 and the back edge (the side edge which is more remote from the front of the copying machine 1) of the original document 210 is in contact with and aligned by the fixed scale 205. Then, the first slider 211 moves forwardly from its standby position, indicated by P11 in FIG. 11, to its position P12 and pauses there (STEP 1).

This movement is the so-called pre-scanning operation. The shading correction and ACS (Auto Color Selection), for automatically determining whether the original document image is a monochrome image or a color image, is executed during the prescanning movement. Since the ACS is a known technique, no description is provided therefor.

Next, the first slider 211 starts its movement in the reverse direction (STEP 2). Image reading (transmission of image data from the CCD 218 to the image storing section 6) starts simultaneously with the passing of the first slider 211 through a point P13, located a specified distance before the position of the leading end of the original document 210, and image writing (transmission of printing data from the image storing section 6 to the laser exposure unit 7) starts simultaneously with the passing of the first slider 211 through a point P21, located a specified distance behind the position of the leading end of the original document 210. Thus, the edge portion of the original document 210 between the leading edge of the original document 210 and a line parallel to the leading edge of the original document 210 and extending through point P21 is not copied onto the copy paper 27.

Then, the image writing ends simultaneously with the passing of the first slider 211 through a point P22, located a specified distance before the position of the trailing end of the original document 210, and the image reading ends simultaneously with the passing of the first slider 211 through a point P14 located a specified distance behind the position of the trailing end of the original document 210 (STEP 3). The distance between points P21 and P22 (the image writing distance in the direction of movement of the conveyor belt 95) is less than the length of the original document in the direction of movement of the conveyor belt 95. Thus, the edge portion of the original document 210 between the trailing edge of the original document 210 and a line parallel to the trailing edge of the original document 210 and extending through point P22 is not copied onto the copy paper 27.

The width of the image writing area in the sub-scanning direction is less than the width of the original document 210 (in the direction perpendicular to the direction of movement of the conveyor belt 95) and is determined by not writing the beginning and ending portions of each mainscan corresponding to the peripheral side edge margins of the original document 210, as shown in the upper portion of FIG. 11.

Subsequently, the first slider 211 pauses at P15 (STEP 4) and reverses the direction of movement to move to P12, or the reverse movement start position, where it stops, to be ready for the next copying process (STEP 5).

The operations in STEPS 2 through 5 are repeated, and when the copying process of a set number of copies is completed, the first slider 211 moves from P12 to P11 to standby there (STEP 6). By the above control, the specified extent of the peripheral edge portions of the original document 210 is not outputted as printing data in the normal mode, so that no copying of the peripheral edge portions is effected on the paper sheet 27.

Figure 12:
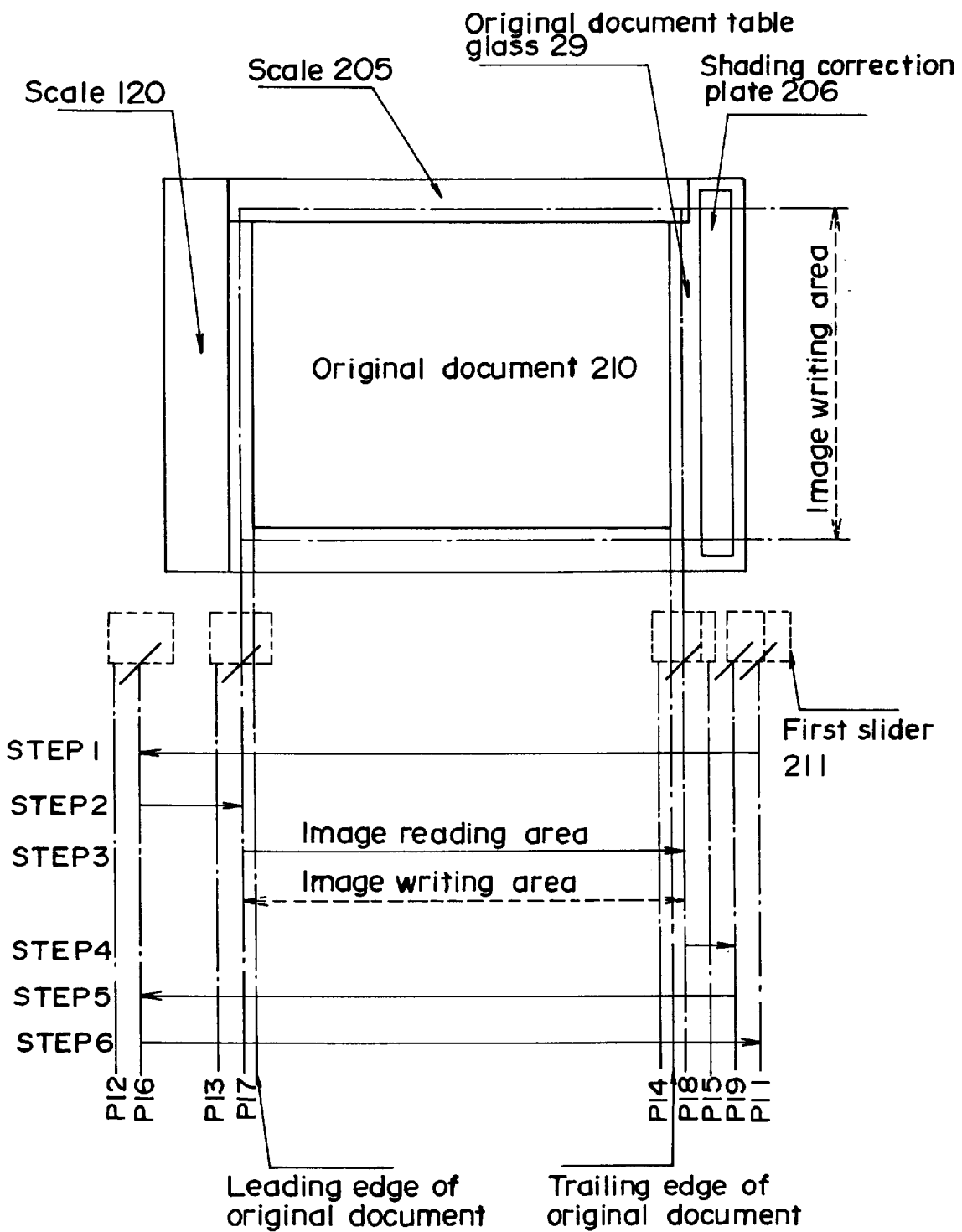
FIG. 12 is a diagrammatic view showing the operation of the first slider of the copying machine of FIG. 1 in a full copy mode.

FIG. 12 shows the case of the full-size mode. When the start key 502 of the operation panel 50 is pressed during the state in which the full-size mode has been selected, the original document 210 is conveyed and positioned by the ADF 60 at the modified placement position illustrated in FIG. 12, i.e., a position in which the leading end of the original document 210 is located apart from the leading edge of the movable scale 120 by a specified distance, and the back edge of the original document 210 is in contact with and aligned by the fixed scale 205. Then, the first slider 211 moves forwardly from its standby position P11 to P16 to pause there (STEP 1). The point P16 is a position displaced rightwardly in FIG. 12 from the reverse movement start position P12 in the aforementioned normal mode in correspondence with the placement position of the original document 210. It is to be noted that the shading correction and ACS are executed similarly to the case of the normal mode during the movement.

Next, the first slider 211 starts its reverse movement by reversing the direction of movement (STEP 2). The image reading and the image writing operations start concurrently, simultaneously with the passing of the first slider 211 through a point P17, which is located a specified distance before the position of the leading end of the original document 210. The point P17 is located in a position displaced rightwardly in FIG. 12 from the image reading start position P13 in the normal mode.

Then, the image reading and image writing operations end concurrently, simultaneously with the passing of the first slider 211 through a point P18 located a specified distance beyond the position of the trailing end of the original document 210 (STEP 3). The point P18 is located in a position displaced rightwardly in FIG. 12 from the image reading end position P14 in the normal mode. The distance between points P17 and P18 (the image writing distance in the direction of movement of the conveyor belt 95) is greater than the length of the original document in the direction of movement of the conveyor belt 95. The width of the image writing area in the sub-scanning direction is greater than the width of the original document 210 (in the direction perpendicular to the direction of movement of the conveyor belt 95) and is determined by starting and stopping the mainscan writing at points outside of the original document 210, as shown in the upper portion of FIG. 12. Thus, the entire extent of the original document 210 is copied onto the copy sheet 27. While the copy sheet 27 can be the same size as the original document 210, it is presently preferred to employ a copy sheet 27 which is larger than the original document 210.

Subsequently, the first slider 211 pauses at P19 (STEP 4) and reverses the direction of movement to move to P16, or the reverse movement start position, where it stops, to be ready for the next copying process (STEP 5).

The operations in STEPS 2 through 5 are subsequently repeated, and when the copying process of a set number of copies is completed, the first slider 211 moves from P16 to P11 to standby there (STEP 6). By the above control, the entire extent of the original document 210 is outputted as printing data to be copied on a paper sheet in the full-size mode.

FIGS. 13 through 18 are flowcharts showing the processing routine of the aforementioned CPU 225. The control contents of the CPU 225 in the normal mode and the full-size mode will be described below with reference to these figures.

Figure 13:
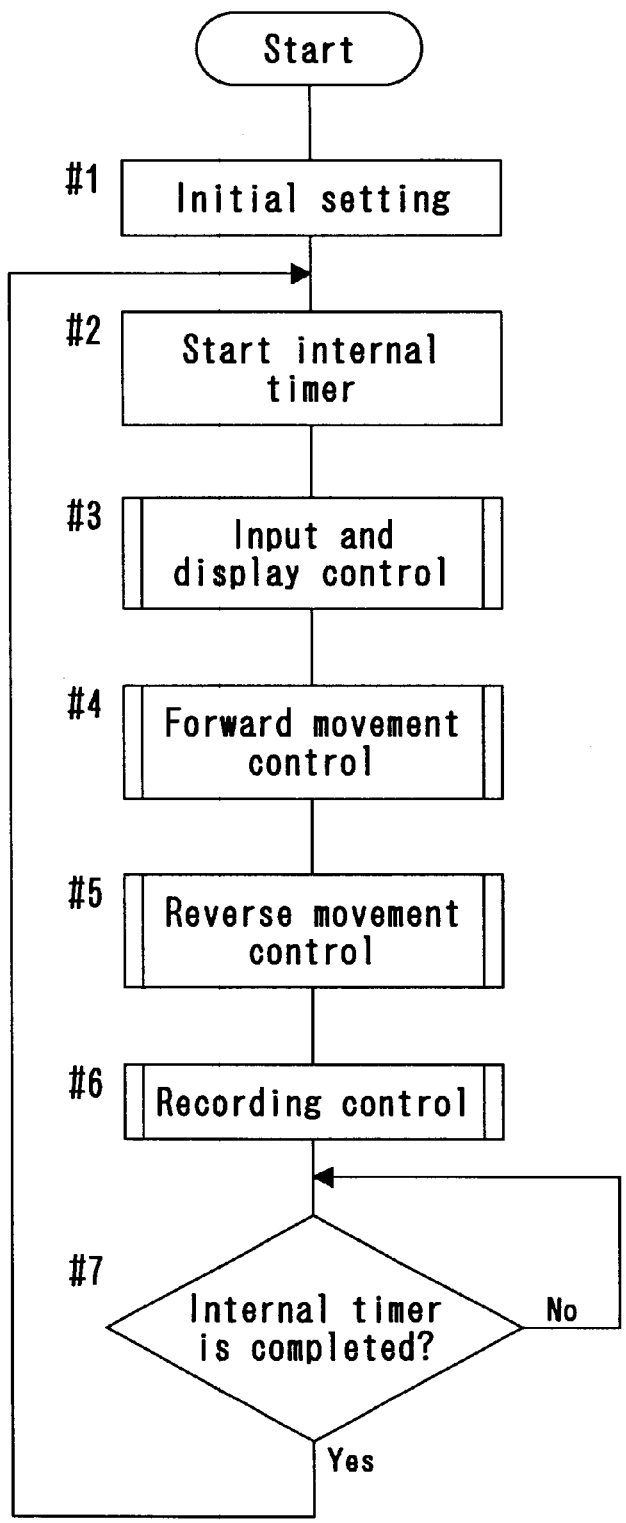
FIG. 13 is a flowchart showing a main control routine executed by the control CPU of the image reader section of the copying machine of FIG. 1.

FIG. 13 shows the main routine of the CPU 225. When the main power of the body of the copying machine 1 is turned ON, an initial setting for setting the copying mode to the normal mode and other operations are executed at step #1, and the internal timer for managing the time of one routine is started at step #2.

An input and display control for controlling a variety of input and display operations from the operation panel 50 is executed at step #3, and a forward movement control and a reverse movement control of the first slider 211 are executed at steps #4 and #5. Further, a recording control including paper sheet feed control is executed at step #6, a completion of the internal timer operation is confirmed at step #7, and the program flow returns to step #2.

Figure 14:
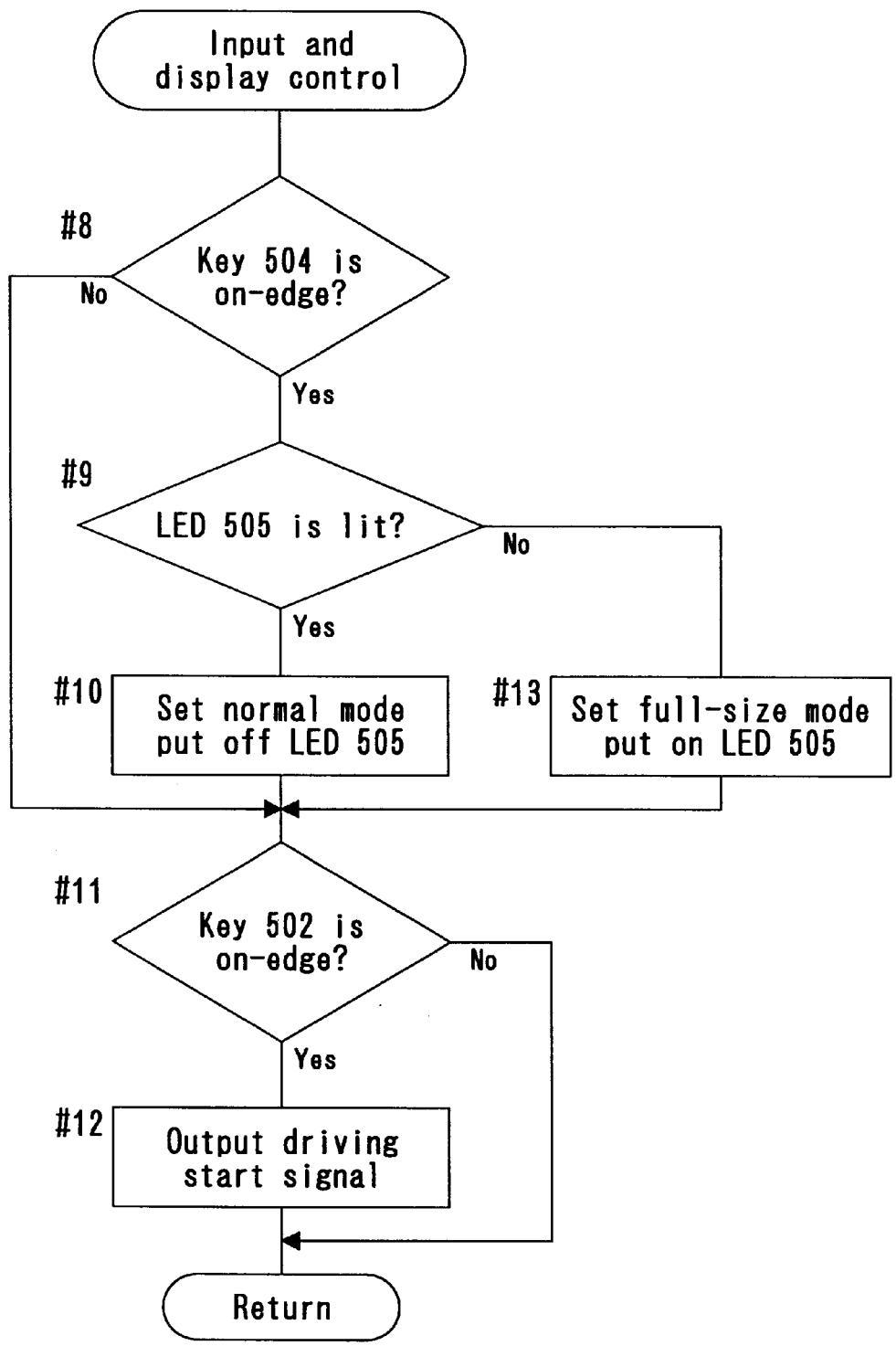
FIG. 14 is a flowchart showing an input and display control subroutine for step #3 of FIG. 13.

FIG. 14 shows an input and display control subroutine executed at the step #3. First, it is determined at step #8 whether or not the full-size mode selection key 504 is on-edge (a change of state when a signal representing a key operation changes from the OFF-state to the ON-state). When the on-edge condition is detected, the program flow proceeds to step #9 to determine the state of the LED 505.

When the LED 505 is lit (YES at step #9), meaning that the full-size mode is currently selected, the copying mode is changed to the normal mode and the LED 505 is turned OFF at step #10.

When the LED 505 is OFF (NO at step #9), meaning that the normal mode is currently set, the copying mode is changed to the full-size mode and the LED 505 is lit at step #13.

Next, when the start key 502 is on-edge at step #11, a signal for starting the driving of the first slider 211 (and the second slider 212) is outputted to the slider motor M at step #12.

Figure 15:
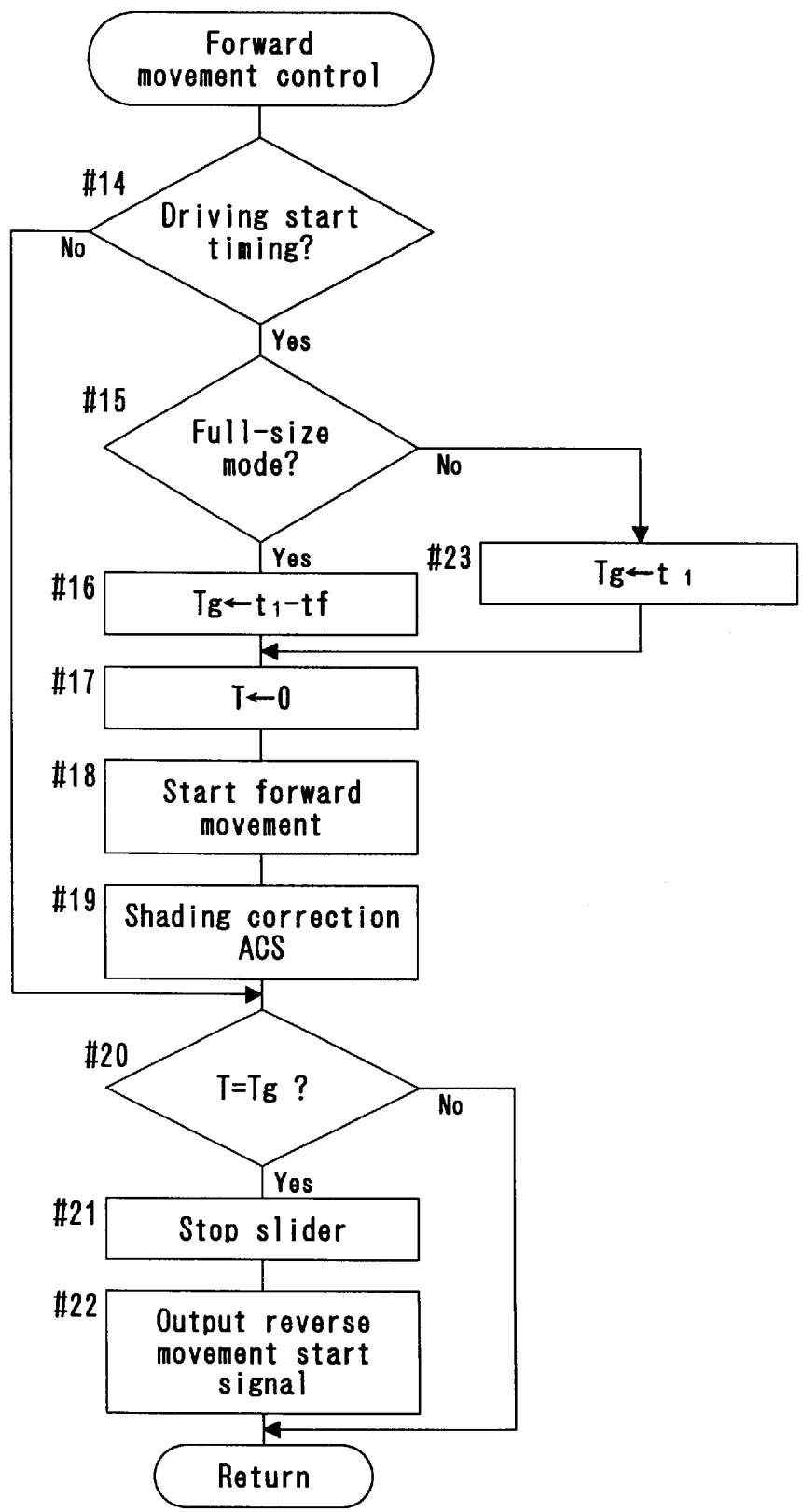
FIG. 15 is a flowchart showing a forward movement control subroutine for step #4 of FIG. 13.

FIG. 15 shows a forward movement control subroutine executed at the aforementioned step #4. First, it is determined at step #14 whether or not the current timing is the driving start timing, i.e., whether a driving start signal is outputted at step #12 of the input and display subroutine of FIG. 14. When the current timing is the driving start timing, the program flow proceeds to step #15. When the current timing is not the driving start timing, the processing in steps #16–#19 is skipped, and the program flow proceeds to step #20.

The state of selection of the copying mode is determined at step #15. When the current mode is the normal mode (NO at step #15), the program flow proceeds to step #23 to set a time t1 for a forward movement timer Tg. In this case, the time t1 is the time required for the first slider 211 to move from its standby position P11 to the reverse movement start position P12 in the normal mode (see FIG. 11).

When the current mode is the full-size mode (YES at step #15), the program flow proceeds to step #16 to set a time (t1−tf) for the forward movement timer Tg. In this case, the time (t1−tf) is the time required for the first slider 211 to move from its standby position P11 to the reverse movement start position P16 in the full-size mode (see FIG. 12). That is, the reverse movement start position P16 of the first slider 211 is set a time tf before (in the rightward direction in FIG. 12) the reverse movement start position P12 in the normal mode.

Next, the value of a drive time timer T for counting the drive time of the first slider 211 is reset to zero at step #17, and the forward movement of the first slider 211 is started at step #18. After executing shading correction and ACS at step #19, waiting is effected for the coincidence of the value of the drive time timer T with the value of the forward movement timer Tg at step #20, the first slider 211 is stopped at step #21, and the reverse movement start signal of the first slider 211 is outputted at step #22.

Figure 16:
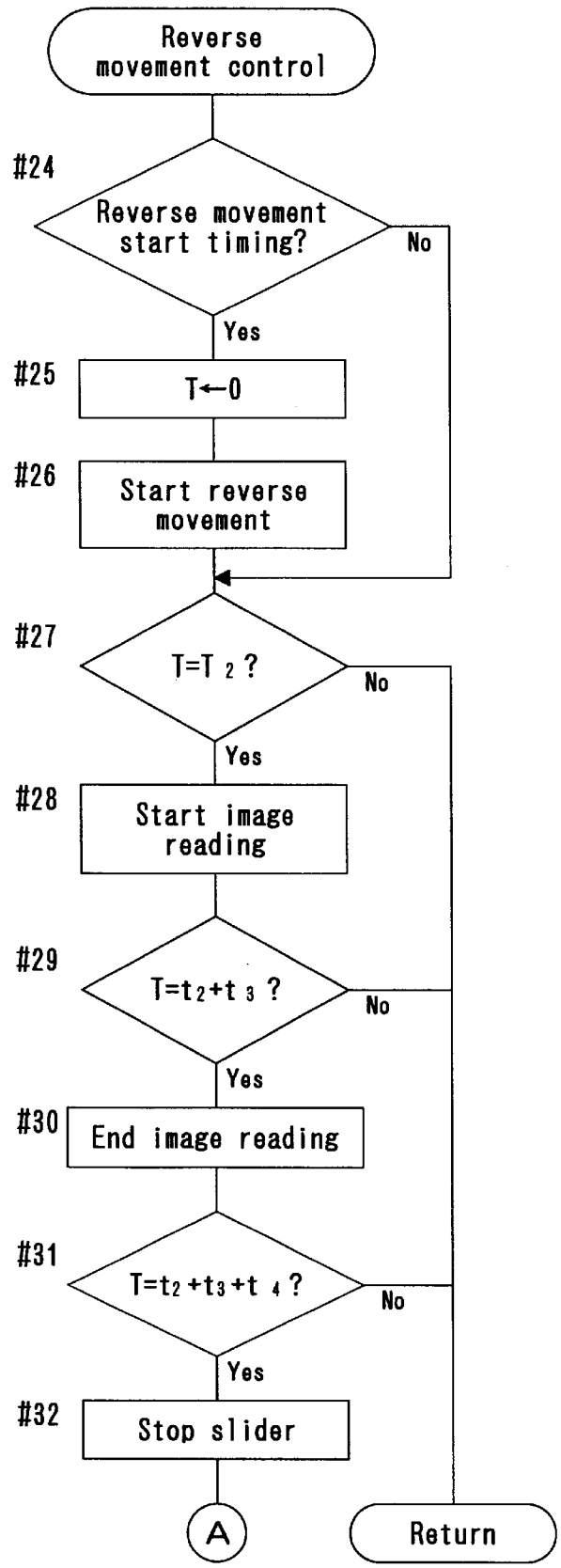
FIGS. 16 and 17 collectively constitute a flowchart showing a reverse movement control subroutine for step #5 of FIG. 13.
Figure 17:
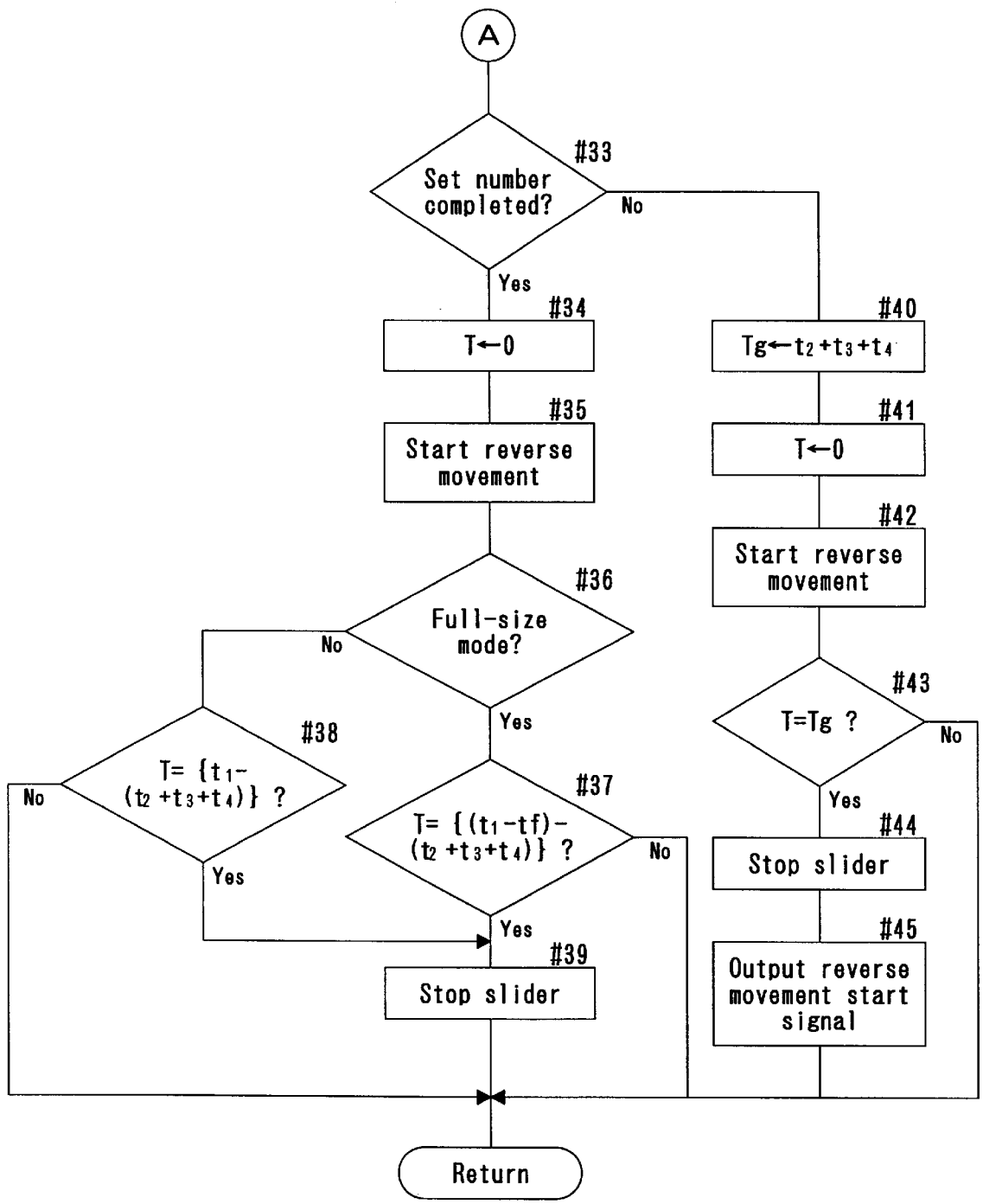

FIGS. 16 and 17 show a reverse movement control subroutine to be executed at step #5 of FIG. 13. First, it is determined at step #24 whether or not the current timing is the reverse movement start timing, i.e., whether the reverse movement start signal is outputted at step #22 of the forward movement control subroutine of FIG. 15 or at step #45 of the present subroutine described later.

When the current timing is the reverse movement start timing, the program flow proceeds to step #25 to reset the aforementioned slider drive time timer T to zero, and the reverse movement of the first slider 211 is started at step #26.

When the current timing is not the reverse movement start timing at step #24, the program flow proceeds to step #27 without executing the processing of steps #25 and #26.

When it is detected at step #27 that the value of the drive time timer T has become a time t2, a signal for starting the image reading is outputted at step #28. In this case, the time t2 is the time required for the first slider 211 to move from P12 to P13 in FIG. 11 or from P16 to P17 in FIG. 12.

Next, when it is detected at step #29 that the value of the drive time timer T has become (t2+t3), the image reading ends at step #30. In this case, t3 corresponds to the length in the sub-scanning direction of the original document 210 and is specified by the original document size detected by the sensors SE2 and SE10 of the ADF 60 in the stage of conveying the original document 210. Therefore, the time (t2+t3) is the time required for the first slider 211 to move from P12 to P14 in FIG. 11 or from P16 to P18 in FIG. 12.

Next, when it is detected at step #31 that the value of the drive time timer T has become (t2+t3+t4), the first slider 211 is stopped at step #32. In this case, the time t4 is the time required for the first slider 211 to move from P14 to P15 in FIG. 11 or from P18 to P19 in FIG. 12. Therefore, the first slider 211 is made to pause at P15 in the normal mode (FIG. 11) and at P19 in the full-size mode (FIG. 12).

Next, it is determined at step #33 whether or not the copying process of the set number of copies is completed. When the copying process of the set number of copies is not completed (NO at step #33), the program flow proceeds to step #40 to set the time (t2+t3+t4) for the forward movement timer Tg. In this case, the time (t2+t3+t4) is the time required for the first slider 211 to move from P15 to P12 in FIG. 11 or from P19 to P16 in FIG. 12.

Then, the drive time timer T is reset to zero at step #41, and the forward movement of the first slider 211 is started at step #42. After waiting for the coincidence of the value of the drive time timer T with the value of the forward movement timer Tg at step #43, the first slider 211 is stopped at step #44, and the reverse movement start signal is outputted at step #45. By this operation, the first slider 211 is set in the reverse movement start position P12 or P16. In the forward movement of the first slider 211 from P15 to P12 or from P19 to P16 in this case, neither the shading correction nor the ACS (step #19 in FIG. 15), executed in the aforementioned forward movement control subroutine, is executed.

When the copying process of the set number of copies is completed (YES at step #33), the program flow proceeds to step #34 to reset the drive time timer T to zero, and the reverse movement of the first slider 211 is restarted at step #35.

The state of selection of the copying mode is determined at step #36. When the current mode is the normal mode (NO at step #36), the program flow proceeds to step #38. When the current mode is the full-size mode (YES at step #36), the program flow proceeds to step #37. When it is detected at step #38 and step #37 that the value of the drive time timer T has become {t1−(t2+t3+t4)} and {(t1−tf)−(t2+t3+t4)}, respectively, the first slider 211 is stopped. In this case, the times {t1−(t2+t3+t4)} and {(t1−tf)−(t2+t3+t4)} are the times required for the first slider 211 to move from P15 to P11 in FIG. 11 and from P19 to P11 in FIG. 12. By this operation, the first slider 211 is stopped in the standby position P11.

As described above, the timing of starting and ending the image reading by the first slider 211 is identical in either the normal mode or the full-size mode, meaning that the extent of reading is changed according to the copying mode by the control of the reverse movement start position of the first slider 211, i.e., the selection of either P12 as the reverse movement start position for the normal mode or P16 as the reverse movement start position for the full-size mode.

Figure 18:
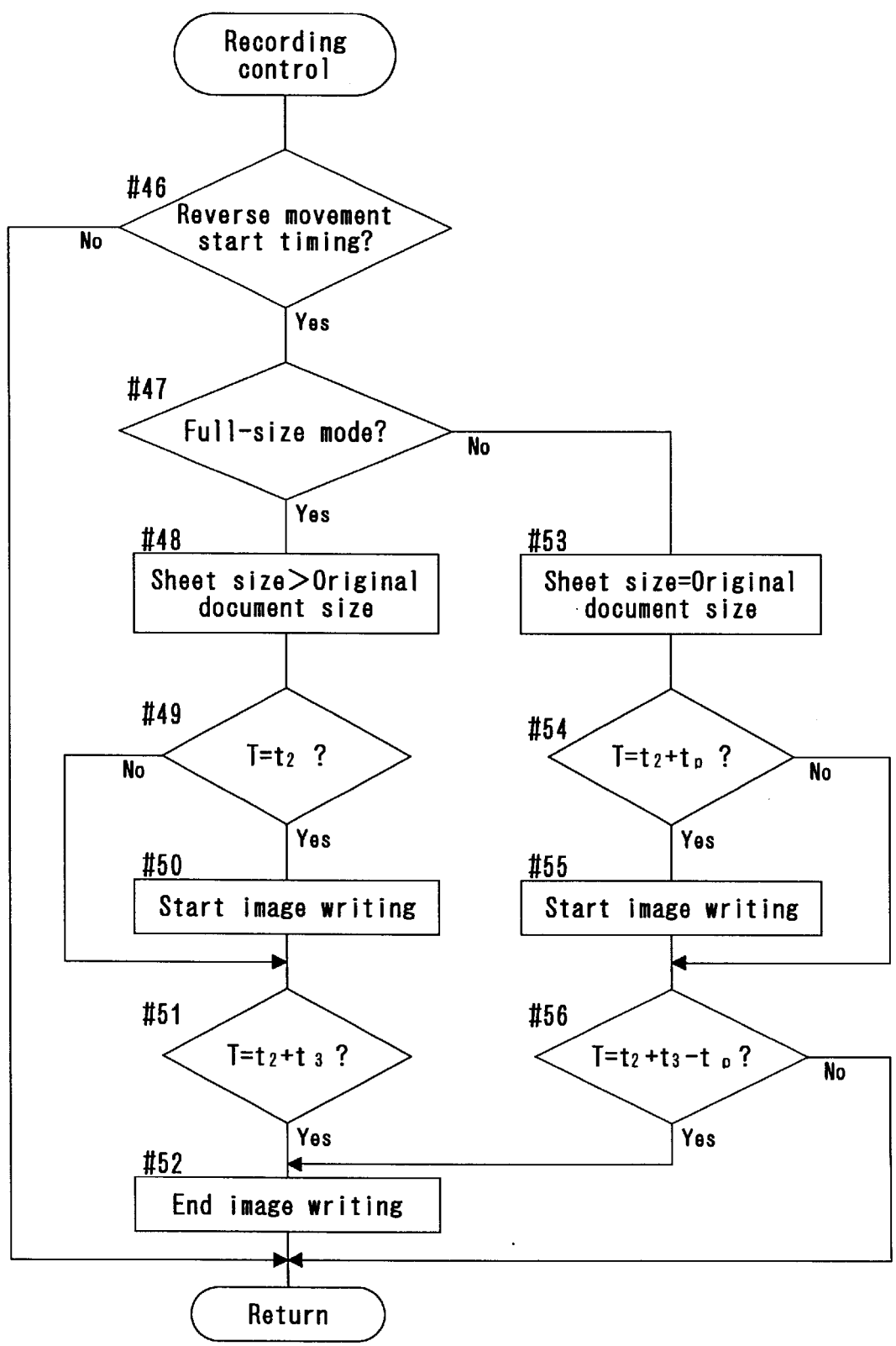
FIG. 18 is a flowchart showing a recording control subroutine for step #6 of FIG. 13.

FIG. 18 is a recording control subroutine executed at step #6 of FIG. 13. First, it is determined at step #46 whether or not the current timing is the reverse movement start timing, i.e., whether the reverse movement start signal is outputted at step #22 of the forward movement control subroutine of FIG. 15 or at step #45 of the reverse movement control subroutine of FIG. 17. When the current timing is not the reverse movement start timing, the following processing is skipped, and this routine ends.

When the current timing is the reverse movement start timing, the program flow proceeds to step #47 to determine the state of selection of the copying mode. When the copying mode is the normal mode (NO at step #47), the program flow proceeds to step #53 to select the paper sheet of the same size as the original document size based on the result of detection at the ADF 60. That is, paper sheets are fed from the paper sheet feed tray in which the paper sheets of that size are stored.

Next, when it is detected at step #54 that the value of the drive time timer T has become (t2+tp), a signal for starting the image writing is outputted at step #55. Further, when it is detected at step #56 that the value of the drive time timer T has become (t2+t3−tp), the image writing ends at step #52.

In this case, the time tp is the time required for the first slider 211 to move from P13 to P21 in FIG. 11 or from P22 to P14 in FIG. 11. In the normal mode, the start of writing is delayed by the time tp after the start of reading, and the writing ends earlier that the reading by the time tp. Thus, the specified extent of the peripheral end portions of the original document 210 is not subjected to the copying process. With this arrangement, a blank margin is formed at the peripheral edges of the paper sheet 27, and therefore, the possible occurrence of jam in the stage of entry for fixing is prevented, and the possible smear of the apparatus body by the toner is reduced.

When the current mode is the full-size mode (YES at step #47), the program flow proceeds to step #48 to select the paper sheet of a size larger than the original document size. Next, when it is detected at step #49 that the value of the drive time timer T has become t2, a signal for starting the image writing is outputted at step #50. Further, when it is detected at step #51 that the value of the drive time timer T has become (t2+t3), the image writing ends at step #52.

That is, by starting and ending the image writing with the same timing (reverse movement control subroutine; see FIG. 16) as that of the image reading in the full-size mode, the entire extent of the original document 210 is copied. Preferably, a copy paper sheet of a size larger than the original document size is selected in the full-size mode as described above. Therefore, even when the entire extent of the original document 210 is copied, a blank margin is formed at the peripheral edges of the larger copy paper sheet. Therefore, the prevention of a jam in the stage of entry for the fixing and the reduction of smear of the apparatus body by the toner are achieved.

An example of the automatic sheet selection in the full-size mode is shown in FIG. 19. Furthermore, in the full-size mode, the original document 210 is placed in the position located apart from the movable scale 120 by a specified distance. Therefore, even when the entire extent of the original document 210 is copied, loss of image, defective reading or the like, do not occur at the end portion of the original document 210 due to the movable scale 120.

Furthermore, it is a well known technique that an original document to be read is positioned by the ADF at a placement position located apart from an original document positioning member such as the movable scale 120. For example, this is accomplished by controlling an operating time period of an original document conveyor such as an conveyor belt by means of a timer.

Although the case where the original document 210 is automatically positioned by the automatic document feeder (ADF 60) is described in the present embodiment, it is of course acceptable for the operator to manually set the original document 210. In this case, when the full-size mode is selected as shown in FIG. 9, it is convenient to execute a display for indicating the placement position of the original document 210 on the LCD panel 503 of the operation panel 50.

Reasonable variations and modifications of the invention are possible within the scope of the foregoing description and the attached drawings.

That which is claimed is:

1. An image forming apparatus for forming an image by reading an original image, said apparatus comprising:

an original document table for placing thereon an original document to be read, the original document having said original image thereon;

a scanner for exposing and scanning the original document positioned on the original document table;

a reader for reading the original image based on scanning of the original document by the scanner, said original document being stationary with respect to said original document table during said scanning and said reading;

a mode setter for selectively setting one of a first mode, in which a specified extent of peripheral edge portions of the original document is not subjected to image formation, and a second mode, in which an entire extent of the original document is subjected to image formation; and a controller for setting an area of scanning for reading image data by the scanner with respect to the original document table, said controller setting a first area of scanning with respect to the original document table for said first mode and setting a second area of scanning with respect to the original document table for said second mode, said second area of scanning being different from said first area of scanning;

wherein in said first mode the original document is placed at a first document position on said original document table during scanning, and wherein in said second mode the original document is placed at a second document position on said original document table during scanning, said second document position being spaced apart from said first document position by a specified distance.

2. An image forming apparatus in accordance with claim 1, further comprising:

a document positioning member which is provided adjacent to an end portion of the original document table for positioning said original document relative thereto for scanning, said document positioning member being movable between an operative position, in which an end of the document positioning member adjacent said end portion of the original document table protrudes above an upper surface of the original document table, and a retracted position, in which said end of the document positioning member is below the upper surface portion of the original document table.

3. An image forming apparatus in accordance with claim 2, wherein in said first document position a leading edge of the original document positioned on the original document table contacts said document positioning member when said document position member is in its operative position, and wherein in said second document position the leading edge of the original document positioned on the original document table is spaced apart from said document positioning member by said specified distance when said document positioning member is in its operative position.

4. An image forming apparatus in accordance with claim 3, further comprising:

an automatic document feeder for conveying the original document onto the original document table and placing the document in said first document position on the original document table when said mode setter sets said first mode and in said second document position on the original document table when said mode setter sets said second mode.

5. An image forming apparatus in accordance with claim 4, further comprising a fixed scale member positioned adjacent to a side edge portion of the original document table, wherein each of said first and second document positions is further defined by a side edge of the original document contacting said fixed scale member.

6. An image forming apparatus in accordance with claim 1, further comprising:

an automatic document feeder for conveying the original document onto the original document table and for placing the document in said first document position on the original document table when said mode setter has set said first mode and for placing the document in said second document position on the original document table when said mode setter has set said second mode.

7. An image forming apparatus in accordance with claim 6, further comprising a fixed scale member positioned adjacent to a side edge portion of the original document table, wherein in each of said first and second document positions a side edge of the original document contacts said fixed scale member.

8. An image forming apparatus in accordance with claim 1, further comprising a designator for designating a placement position of the original document on the original document table, said controller controlling said designator so that said designator designates said first document position of the original document on the original document table when said mode setter sets the first mode, and so that said designator designates said second document position of the original document on the original document table when said mode setters sets the second mode.

9. An image forming apparatus in accordance with claim 1, wherein said scanner scans the original document positioned on the original document table in forward and reverse directions, wherein said reader reads the original image based on scanning of the original document in the reverse direction of the scanner, and wherein said controller sets the area of scanning by the scanner with respect to the original document table in the first and second modes by controlling a scanning start position in the reverse direction of the scanner.

10. An image forming apparatus in accordance with claim 1, further comprising an original document size detecting device, for detecting the size of the original document to be read, and a plurality of paper sheet feeders, for storing paper sheets therein, paper sheets stored in one of the plurality of paper sheet feeders having a size which is the same as a size of the original document, a size of paper sheets stored in another of the plurality of paper sheet feeders being larger than the size of the original document;

wherein said controller executes control based on an original document size detected by the original document size detecting device so that said one of the plurality of paper sheet feeders having stored therein paper sheets of a size larger than the size of the original document feeds a paper sheet when the second mode is set by said mode setter.

11. A method for forming an image by reading an original image, said method comprising the steps of:

selectively setting one of a first mode, in which a specified extent of peripheral edge portions of an original document to be read is not subjected to image formation, and a second mode, in which an entire extent of an original document to be read is subjected to image formation;

positioning an original document on an original document table according to said set one of first and second modes, the original document having said original image thereon;

setting an area of scanning with respect to the original document table for reading image data according to said set one of first and second modes;

exposing and scanning the original document positioned on the original document table; and reading the original image based on the scanning of the original document, said original document being kept substantially stationary with respect to said original document table during said scanning and said reading steps;

wherein a first area of scanning with respect to the original document table is set for said first mode and a second area of scanning with respect to the original document table is set for said second mode, said second area of scanning being different from said first area of scanning;

wherein in said first mode said positioning step comprises positioning said original document at a first document position on said original document table, and wherein in said second mode said positioning step comprises positioning said original document at a second document position on said original document table, said second document position being spaced apart from said first document position by a specified distance.

12. A method in accordance with claim 11, further comprising:

providing a document positioning member adjacent to an end portion of the original document table with the document positioning member being in an operative position, in which an end of the document positioning member adjacent said end portion of the original document table protrudes above an upper surface of the original document table during the positioning of the original document on the original document table; and moving the document positioning member to a retracted position, in which said end of the document positioning member is below the upper surface portion of the original document table, when the scanning of the original document is completed.

13. A method in accordance with claim 12, wherein in said first document position a leading edge of the original document that is positioned on the original document table contacts said document positioning member when said document position member is in its operative position, and wherein in said second document position the original document placed on the original document table is spaced apart from said document positioning member by a specified distance when said document positioning member is in its operative position.

14. A method in accordance with claim 11, wherein in said first mode the original document is placed in a first document position and wherein in said second mode the original document is placed in a second document position, a leading edge of the first document position being spaced apart from a leading edge of the second document position by a specified distance.

15. A method in accordance with claim 11, wherein the step of exposing and scanning comprises scanning the original document positioned on the original document table in a forward scanning direction and in a reverse scanning direction;

wherein the step of reading the original image based on scanning of the original document is accomplished during the scanning in the reverse scanning direction; and wherein the extent of scanning with respect to the original document table in the first and second modes is set by changing a scanning start position in the reverse scanning direction.

16. A method in accordance with claim 11, further comprising:

detecting a size of the original document to be read, providing a first plurality of paper sheets having a size that is the same as the size of the original document;

providing a second plurality of paper sheets having a size which is larger than the size of the original document; and feeding a paper sheet from one of said first and second pluralities of paper sheets based on a thus detected original document size so that a paper sheet of a size larger than the size of the original document is fed when the second mode is set.

17. An image forming apparatus for forming an image by reading an original image on an original document comprising:

an original document table for placing thereon an original document to be read;

a mode setter for selectively setting one of a first mode, in which a portion of the original document is not subjected to image formation, and a second mode, in which an entire extent of the original document is subjected to image formation;

a controller for setting an image reading area with respect to the original document table based on said selected mode, said controller setting a first image reading area with respect to the original document table for said first mode and a second image reading area with respect to the original document table for said second mode, said second image reading area being different from said first image reading area;

a scanner for scanning the original document positioned on the original document table; and a reading device on said scanner for reading the original image during scanning of the original document by the scanner, said reading device reading said original image over said image reading area set by said controller, said original document being stationary with respect to said original document table during said scanning and said reading;

wherein in said first mode the original document is placed at a first document position on said original document table during scanning, and wherein in said second mode the original document is placed at a second document position on said original document table during scanning, said second document position being spaced apart from said first document position by a specified distance.

18. An image forming apparatus in accordance with claim 17, wherein said scanner scans the original document positioned on the original document table in forward and reverse directions, said reader reading the original image based on scanning of the original document in the reverse direction of the scanner, said controller controlling the area of scanning by the scanner with respect to the original document table in the first and second modes by controlling a scanning start position in the reverse direction of the scanner.

19. An image forming apparatus in accordance with claim 17, further comprising:

an original document size detecting device for detecting a size of the original document to be read, and a plurality of paper sheet feeders for storing paper sheets therein, the paper sheets stored in one of the plurality of paper sheet feeders having a size which is the same as the size of the original document, a size of the paper sheets stored in another of the plurality of paper sheet feeders being larger than the size of the original document;

wherein said controller executes control based on an original document size detected by the original document size detecting device so that said one of the plurality of paper sheet feeders storing therein a paper sheet of a size larger than the size of the original document feeds a paper sheet when the second mode is set by said mode setter.

20. A method of forming an image by reading an original image on an original document comprising the steps of:

positioning an original document to be read on an original document table, said original document having said original image thereon;

selectively setting one of a first mode, in which a portion of the original document is not subjected to image formation, and a second mode, in which an entire extent of the original document is subjected to image formation;

setting an image reading area with respect to the original document table based on said selected mode wherein a first image reading area with respect to the original document table is set for said first mode and a second image reading area with respect to the original document table is set for said second mode, said second image reading area being different from said first image reading area;

scanning the original document positioned on the original document table; and reading the original image over said image reading area set by said controller during scanning of the original document, said original document being kept substantially stationary with respect to said original document table during said scanning and said reading steps;

wherein in said first mode said positioning step comprises positioning said original document at a first document position on said original document table, and wherein in said second mode said positioning step comprises positioning said original document at a second document position on said original document table, said second document position being spaced apart from said first document position by a specified distance.

21. A method of forming an image in accordance with claim 20, wherein the original document positioned on the original document table is scanned in forward and reverse directions and reading the original image during scanning of the original document is accomplished in the reverse direction of scanning, the area of scanning with respect to the original document table in the first and second modes being controlling by controlling a scanning start position in the reverse direction for scanning.

22. A method of forming an image in accordance with claim 20, further comprising the steps of:

detecting a size of the original document to be read;

providing a plurality of paper sheets including sheets having a size which is the same as the size of the original document and sheets having a size larger than the size of the original document; and selecting one of said plurality of sheets for image formation based on said mode set so that a paper sheet of a size larger than the size of the original document is selected for image formation when the second mode is set, and a paper sheet having a size which is the same as the size of the original document is selected for image formation when the first mode is set.

* * * * *